United States Patent
Nakano et al.

(10) Patent No.: US 9,516,530 B2
(45) Date of Patent: Dec. 6, 2016

(54) RADIO COMMUNICATION APPARATUS AND RADIO COMMUNICATION SYSTEM

(75) Inventors: Hiroshi Nakano, Osaka (JP); Takeshi Onodera, Osaka (JP); Toshizo Nogami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 134 days.

(21) Appl. No.: 13/062,175

(22) PCT Filed: Aug. 31, 2009

(86) PCT No.: PCT/JP2009/065158
§ 371 (c)(1),
(2), (4) Date: Mar. 3, 2011

(87) PCT Pub. No.: WO2010/026936
PCT Pub. Date: Mar. 11, 2010

(65) Prior Publication Data
US 2011/0149792 A1   Jun. 23, 2011

(30) Foreign Application Priority Data
Sep. 4, 2008  (JP) ................................. 2008-227164

(51) Int. Cl.
*H04W 24/10*   (2009.01)
*H04W 8/24*    (2009.01)
(Continued)

(52) U.S. Cl.
CPC .............. *H04W 24/10* (2013.01); *H04W 8/24* (2013.01); *H04W 72/02* (2013.01); *H04W 72/04* (2013.01)

(58) Field of Classification Search
USPC .............................. 370/252, 329; 455/67.13
See application file for complete search history.

(56) References Cited

U.S. PATENT DOCUMENTS

| | | | |
|---|---|---|---|
| 8,094,733 B2 * | 1/2012 | Kwon et al. .................. | 375/260 |
| 2005/0174982 A1 * | 8/2005 | Uehara et al. ................ | 370/345 |

(Continued)

FOREIGN PATENT DOCUMENTS

| | | |
|---|---|---|
| CN | 101233774 A | 7/2008 |
| JP | 2004-208234 A | 7/2004 |

(Continued)

OTHER PUBLICATIONS

Huawei, "TDD reporting periodicity for CQI PUCCH 1-0 7.1.2.", TSG-RAN Working Group 4 (Radio) meeting #54 San Francisco, US, Feb. 22-26, 2010. R4-100519.

(Continued)

*Primary Examiner* — Hassan Kizou
*Assistant Examiner* — Hashim Bhatti
(74) *Attorney, Agent, or Firm* — Birch, Stewart, Kolasch & Birch, LLP

(57) ABSTRACT

A CQI control unit 401 inputs, to a subchannel selecting unit 402, subchannel estimation values for report bands which are based on control information received from a control information separating unit 221, at report timings based on the control information. The subchannel selecting unit 402 selects a predetermined number (M) of subchannels on the basis of the received subchannel estimation values, and inputs information indicating the selected subchannels and the qualities of the selected channels to a CQI constructing unit 403. Based on a predetermined format, the CQI constructing unit 403 constructs CQIs by using the qualities of the selected channels and the information indicating the selected channels, and inputs the CQIs to the coding unit 210. Here, as the channel quality, an average value of each of SNR, SINR, and CINR of subcarriers belonging to the subchannel is used. Alternatively, the poorest quality among the subcarriers included in the subchannel may be used as (Continued)

the channel quality of the subchannel, or information indicating the MCS required by the receiver may be used as the channel quality. In this way, it is possible to provide a method that enables the transmission of CQIs at their optimum intervals even in a case of a system using multiple discontinuous bands.

8 Claims, 16 Drawing Sheets

(51) Int. Cl.
*H04W 72/02* (2009.01)
*H04W 72/04* (2009.01)

(56) References Cited

U.S. PATENT DOCUMENTS

| | | |
|---|---|---|
| 2006/0089102 A1 | 4/2006 | Nishio et al. |
| 2007/0026808 A1 | 2/2007 | Love et al. |
| 2007/0115796 A1 | 5/2007 | Jeong et al. |
| 2007/0242770 A1 | 10/2007 | Kim et al. |
| 2008/0227395 A1* | 9/2008 | Kim et al. ............ 455/62 |
| 2009/0141648 A1* | 6/2009 | Imamura et al. ........ 370/252 |
| 2009/0147869 A1* | 6/2009 | Duan et al. ............ 375/260 |
| 2009/0209261 A1 | 8/2009 | Kuri et al. |
| 2010/0014473 A1 | 1/2010 | Ofuji et al. |
| 2010/0034108 A1* | 2/2010 | Ode .................... 370/252 |
| 2010/0093287 A1* | 4/2010 | Higuchi et al. ........ 455/67.13 |
| 2010/0136989 A1* | 6/2010 | Westerberg et al. ...... 455/450 |
| 2010/0222008 A1* | 9/2010 | Astely et al. .......... 455/67.11 |
| 2011/0080968 A1* | 4/2011 | Seo et al. ............. 375/267 |

FOREIGN PATENT DOCUMENTS

| | | |
|---|---|---|
| JP | 2006-50545 A | 2/2006 |
| JP | 2007-110529 A | 4/2007 |
| WO | WO 2008/044529 A1 | 4/2008 |
| WO | WO 2010/016680 A2 | 2/2010 |
| WO | WO 2010/016698 A2 | 2/2010 |
| WO | WO 2010/048142 A1 | 4/2010 |
| WO | WO 2010/077051 A2 | 7/2010 |

OTHER PUBLICATIONS

InterDigital Communications LLC "Performance evaluation of frequency-selective CQI schemes for periodic PUCCH reporting in EUTRA", 3GPP TSG WG1 Meeting #51bis Sevilla, Spain, Jan. 14-18, 2008, R1-080404.
Panasonic "Technical Proposals and considerations for LTE advanced", Apr. 7, 2008. REV-080007.
Samsung "A periodic CQI Activation in CA", 3GPP TSG RAN WG1 #61bis Dresden, Germany, Jun. 28-Jul. 2, 2010. R1-103652.
Samsung "CQI report and scheduling procedure", 3GPP TSG-RAN WG1 Meeting #42bis San Diego, USA, Oct. 10-14, 2005. Tdoc R1-051045.
Samsung "Study on periodic feedback of PMI/CQI responding to CSI-RS", 3GPP TSG WG1 #60bis Montreal, Canada, May 10-14, 2010. R1-103029.
European Patent Office Office Action dated Apr. 25, 2016 for EP Application No. 09811462.2.

\* cited by examiner

| CQI index | Modulation | Coding rate | efficiency |
|---|---|---|---|
| 0 | out of range | | |
| 1 | QPSK | 1/3 | 0.6667 |
| 2 | QPSK | 1/2 | 0.5000 |
| 3 | 16QAM | 1/3 | 1.3333 |
| 4 | QPSK | 3/4 | 1.5000 |
| 5 | 16QAM | 1/2 | 2.0000 |
| 6 | 16QAM | 3/4 | 3.0000 |
| 7 | 64QAM | 3/4 | 4.5000 |

RADIO COMMUNICATION APPARATUS AND RADIO COMMUNICATION SYSTEM

TECHNICAL FIELD

The present invention relates to a radio communication technique, and particularly to a technique for suppressing deterioration of the transmission characteristics caused by the reporting of CQIs.

BACKGROUND ART

About AMC

As a third generation communication method, there is high speed down link packet access (HSDPA) which is developed by the 3GPP. In HSDPA, adaptive modulation and coding (AMC) is used to achieve high-quality, high-speed transmission (for example, see Non-patent Literature 1). In HSDPA, based on report information, i.e., CQI (Channel Quality Indicator), which a base station receives from a terminal, an MCS (Modulation and Coding Scheme), i.e., the modulation scheme and the coding ratio, is controlled adaptively. As the channel quality, e.g., SNR (Signal to Noise power Ratio) or SINR (Signal to Interference plus Noise power Ratio) is used.

About OFDM

Meanwhile, as a prospective next generation communication method, there is OFDM (Orthogonal Frequency Division Multiplex) scheme. The OFDM scheme is a scheme that uses subcarriers orthogonal to each other to transmit a large amount of data.

About Method of Compressing CQI

In the OFDM scheme, a number of subcarriers exist, and it is therefore possible to improve the transmission efficiency by adaptively controlling the MCS for each subcarrier in accordance with the channel quality. However, when all terminals return information on the subcarriers to a base station, the uplink resource often becomes insufficient. Thus, how to compress the information on channel quality and to send it as a CQI is a matter to study in the next generation communication scheme (see Patent Literatures 1 and 2 listed below).

As one method therefor, the channel quality of a subchannel in which multiple subcarriers are gathered together may be returned to the base station, instead of returning the channel quality of every single subcarrier.

In a case where multiple terminals perform communication with one base station, conceivable is a method in which subchannels having good channel qualities for the individual terminal are allocated preferentially to that terminal. This is called scheduling. By scheduling, the throughput of the whole system can be improved.

About Transmission Interval of CQI Dependent on Channel Variation Rate

In a communication system as described above where the scheduling and AMC are performed based on the CQI from the terminal, there exists an optimum CQI transmission interval that is correlated to the rate of variation of the downlink channel. There has been proposed a technique to control the CQI transmission interval in accordance with the variation rate (see Patent Literature 3 listed below).

About Aggregation

Meanwhile, in the next generation communication scheme, it is conceivable to perform communication using a broad band in order to achieve high speed data communication. However, there may be a band already being used by an existing vendor, and hence it is difficult to allocate a wide range of bands continuously. For this reason, a technique has been needed which allows a terminal to communicate with a base station while gathering and simultaneously using discontinuous bands (see Non-patent Literature 2 listed below).

Patent Literature 1: Japanese Patent Application 2004-208234
Patent Literature 2: Japanese Patent Application 2006-50545
Patent Literature 3: Japanese Patent Application 2007-110529
Non-patent Literature 1: "CQI report and scheduling procedure," 3GPP, TSG-RAN WG1 Meeting #42 bis. R1-051045, October 2005
Non-patent Literature 2: "Technical Proposals and Consideration for LTE-Advanced," 3GPP, Workshop, IMT-Advanced, REV-080007, April 2008

DISCLOSURE OF THE INVENTION

Problem to be Solved by the Invention

However, in the case where communication using scheduling and AMC is performed while utilizing multiple discontinuous bands, it is difficult to employ the conventional technique of controlling the CQI transmission interval as it is because the rate of channel variation differs depending on the band.

The present invention has been made in view of the above circumstance, and has an object to provide a method that enables the transmission of CQIs at their optimum intervals even in a case of a system using multiple discontinuous bands.

Means for Solving the Problem

An aspect of the present invention provides a receiver in a radio communication system including a transmitter and the receiver, the receiver receiving data allocated to one or more of subchannels belonging to any of a plurality of bands, the receiver characterized by including: a CQI unit that generates mutually different CQIs on the basis of each of the bands; and a CQI reporting unit that reports any two of the CQIs based on the respective bands to the transmitter respectively at mutually different report intervals. Preferably, of the CQIs based on the two of the bands having the mutually different CQI report intervals, the CQI reporting unit reports the CQI based on the band of a lower frequency at a longer interval than the CQI based on the band of a higher frequency. The receiver may further include a control information separating unit that separates control information from the downlink transmitted data and inputs the control information to the CQI unit, the control information indicating allocation of an uplink resource for reporting each CQI based on the corresponding band and the control information may include information indicating CQI report timings respectively based on the bands. Here, the information indicating the CQI report timings preferably includes information specifying, for every report, a timing at which the CQI based on the corresponding band is reported. Preferably, the information indicating the CQI report timings includes information specifying initial report timings for the CQIs based on the respective bands and also specifying cycles for second and subsequent reports of the CQIs based on the respective bands. Preferably the CQI reporting unit shares, with the transmitter, a correlation between the transmission bands used for the downlink and the CQI report cycles, and the CQI reporting unit reports the CQIs based on the respective bands to the transmitter in accordance with the CQI report cycles that are determinable by referring to the correlation via information indicating the transmission bands used for the downlink transmitted by the transmitter.

Preferably, when two or more of the CQIs based on the basis of the respective bands are to be reported in a same frame, the CQI unit generates one CQI based on all the bands where the CQIs are to be reported in the frame. Here, it is preferable that the CQI unit includes a CQI controlling unit, a subchannel selecting unit, and a CQI constructing unit, the CQI controlling unit selects qualities of all the subchannels belonging to the bands where the CQIs are to be reported, and inputs the qualities to the subchannel selecting unit, the subchannel selecting unit selects a predetermined number of qualities from among the qualities of the subchannels thus inputted, and inputs, to the CQI constructing unit, information indicating selected subchannels and information indicating the channel qualities of the selected subchannels, and the CQI constructing unit constructs CQIs on the basis of the inputted information indicating the selected subchannels and the inputted information indicating the channel qualities of the selected subchannels.

Preferably, the information indicating the CQI report timings includes information specifying a report cycle of each CQI based on the corresponding band on a frame basis, the CQI includes any one of the CQIs based on the respective bands, and the control information includes information indicating that, of the CQIs based on any two of the bands, the CQI based on the band of the band of a higher frequency is reported more frequently than the CQI based on the band of the band of a lower frequency.

Preferably, any of the control information includes periodic CQI control information specifying a report cycle of each CQI based on the corresponding band on a frame basis, any of the control information includes aperiodic CQI control information specifying, for every transmission, a frame with which to transmit each CQI based on the corresponding band, the receiver further comprises a control information separating unit, an aperiodic CQI unit, and a periodic CQI unit, the control information separating unit separates aperiodic CQI control information and periodic CQI control information from the downlink transmitted data, and inputs the aperiodic CQI control information and the periodic CQI control information to the aperiodic CQI unit and the periodic CQI unit, respectively, the aperiodic CQI unit generates a CQI based on the band used for reporting the CQI included in the aperiodic CQI control information, the periodic CQI unit generates a CQI based on the band used for reporting the CQI included in the periodic CQI control information, and the CQI reporting unit reports the aperiodic CQI and the periodic CQI to the transmitter on the basis of the information indicating the CQI report timings. Preferably, the periodic CQI control information includes information for allocating frames for reporting the CQIs in a same report cycle based on any two of the bands and the aperiodic CQI control information includes information specifying, for every report, a frame for reporting the CQI based on one of the two bands with a higher frequency.

Preferably, the periodic CQI control information includes information specifying a cycle of a frame for reporting the CQI based on one of any two of the bands with a lower frequency, the aperiodic CQI control information includes information specifying, for every report, a frame for reporting the CQI based on the other one of the two bands with a higher frequency, and a report interval of the CQI based on the band with the higher frequency is set shorter than a report interval of the CQI based on the band with the lower frequency. Preferably, the periodic CQI control information includes information specifying a cycle of a frame for reporting the CQI based on one of any two of the bands with a lower frequency, and information specifying a cycle of a frame for reporting the CQI based on the other one of the two bands with a higher frequency, the cycle being longer than the cycle for the CQI based on the band with the lower frequency, the aperiodic CQI control information includes information specifying, for every report, a frame for reporting the CQI based on the one of the two bands with the higher frequency, and the report intervals are so set that a report interval, which is obtained by combining the periodic CQI and the aperiodic CQI both based on the band with the higher frequency, is shorter than a report interval of the periodic CQI based on the band with the lower frequency.

Another aspect of the present invention provides a transmitter in a radio communication system including the transmitter and a receiver, the transmitter transmitting data to the receiver while allocating, to the receiver, one or more of subchannels belonging to any of a plurality of bands, the transmitter characterized by comprising a CQI acquiring unit that acquires any two of the CQIs based on the respective bands from the receiver respectively at mutually different report intervals. Preferably, of the CQIs based on the two of the bands having the mutually different CQI report intervals, the CQI acquiring unit acquires the CQI based on the band of a lower frequency at a longer interval than the CQI based on the band of a higher frequency. Preferably, the transmitter according further includes: a control information generating unit that generates control information indicating allocation of an uplink resource for requiring the receiver to report each CQI based on the corresponding band; and a control information transmitting unit that transmits the control information, and the control information includes information indicating CQI report timings respectively based on the bands. Preferably, the information indicating the CQI report timings includes information specifying, for every report, timings at which the CQIs based on the respective bands are reported. Preferably, the information indicating the CQI report timings includes information specifying initial report timings for the CQIs based on the respective bands and also specifying cycles for second and subsequent reports of the CQIs based on the respective bands. Preferably, the control information transmitting unit shares, with the receiver, a correlation between the transmission bands used for the downlink and the CQI report cycles, and the control information transmitting unit transmits information indicating the transmission bands used for the downlink as the information indicating the CQI report timings.

When two or more of the CQIs based on the basis of the respective bands are to be acquired in a same frame, the CQI acquiring unit may acquire one CQI based on all the bands where the CQIs are to be acquired in the frame. Alternatively, it is preferable that the information indicating the CQI report timings includes information specifying a report cycle of each CQI based on the corresponding band on a frame basis, the CQI includes any one of the CQIs based on the respective bands, and the control information includes information indicating that, of the CQIs based on any two of the bands, the CQI based on the band of the band of a higher frequency is reported more frequently than the CQI based on the band of the band of a lower frequency.

Preferably, any of the control information includes periodic CQI control information specifying a report cycle of each CQI based on the corresponding band on a frame basis, and any of the control information includes aperiodic CQI control information specifying, for every transmission, a frame with which to transmit each CQI based on the corresponding band.

Preferably, the periodic CQI control information includes information for allocating frames for reporting the CQIs in a same report cycle based on any two of the bands, and the aperiodic CQI control information includes information specifying, for every report, a frame for reporting the CQI based on one of the two bands with a higher frequency. Preferably, the periodic CQI control information includes information specifying a cycle of a frame for reporting the CQI based on one of any two of the bands with a lower frequency, the aperiodic CQI control information includes information specifying, for every report, a frame for reporting the CQI based on the other one of the two bands with a higher frequency, and a report interval of the CQI based on the band with the higher frequency is set shorter than a report interval of the CQI based on the band with the lower frequency.

Preferably, the periodic CQI control information includes information specifying a cycle of a frame for reporting the CQI based on one of any two of the bands with a lower frequency, and information specifying a cycle of a frame for reporting the CQI based on the other one of the two bands with a higher frequency, the cycle being longer than the cycle for the CQI based on the band with the lower frequency, the aperiodic CQI control information includes information specifying, for every report, a frame for reporting the CQI based on the one of the two bands with the higher frequency, and the report intervals are so set that a report interval, which is obtained by combining the periodic CQI and the aperiodic CQI both based on the one of the two bands with the higher frequency, is shorter than a report interval of the periodic CQI based on the one of the two bands with the lower frequency.

Still another aspect of the present invention provides a radio communication system including: a transmitter and a receiver, the transmitter transmitting data to the receiver while allocating, to the receiver, one or more of subchannels belonging to any of a plurality of bands, the receiver receiving the data, the radio communication system characterized in that the receiver includes a CQI unit that generates CQIs based on the bands, and a CQI reporting unit that reports any two of the CQIs based on the bands to the transmitter respectively at mutually different report intervals, and the transmitter includes a CQI acquiring unit that acquires the CQIs based on the respective two bands from the receiver at the respective report intervals.

Yet still another aspect of the present invention provides a method for receiving, in a radio communication system including a transmitter and a receiver, data allocated to one or more of subchannels belonging to any of a plurality of bands, the method characterized by including the steps of: generating mutually different CQIs on the basis of each of the bands; and reporting any two of the CQIs based on the respective bands to the transmitter respectively at mutually different report intervals.

The present invention may be a program for causing a computer to perform the above-described method, and also may be a computer-readable recording medium in which the program is recorded. The program may be one acquired through a transmission medium such as the Internet.

Effects of the Invention

According to the present invention, the receiver can continue to report CQIs with frequencies suitable for the variations of the channels of both bands. Thus, the channel quality information on the communication band as a whole can be reported efficiently. As a result, in communication performed while reporting the CQIs associated with all the bands, the effects of the scheduling and AMC are enhanced, whereby the transmission efficiency of the whole system is improved.

The description herein includes the contents of the description and/or the drawings provided in Japanese Patent Application Publication No. 2008-227164, which is the basis of priority of the present application.

Figure 1A:
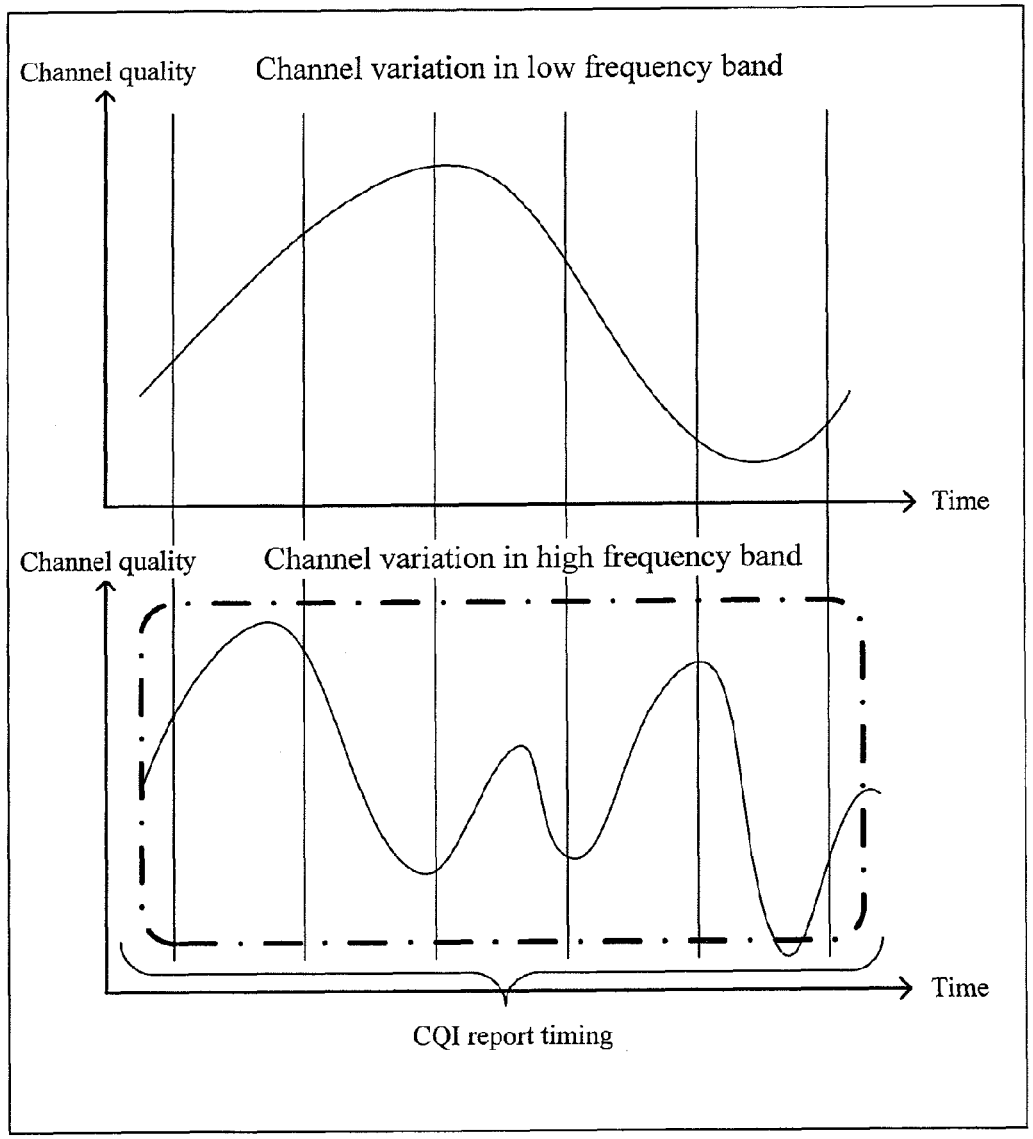
FIG. 1A is a diagram showing an example of channel variation in a case where communication is performed using two different bands.

EXPLANATION OF REFERENCE NUMERALS receiver 200, antenna 201, radio receiving unit 202, GI (Guard Interval) removing unit 203, FFT (Fast Fourier Transform) unit 204, channel estimating unit 205, channel compensating unit 206, demapping unit 222, decoding unit 223, control information separating unit 221, CQI unit 209, coding unit 210, mapping unit 211, frame constructing unit 212, IFFT (Inverse Fast Fourier Transform) unit 213, GI inserting unit 214, radio transmitting unit 215 transmitter 300, antenna 301, radio receiving unit 302, GI removing unit 303, FFT unit 304, uplink channel estimating unit 305, uplink channel compensating unit 306, demapping unit 307, decoding unit 308, CQI separating unit 309, downlink channel restoring unit 310, scheduling unit 311, control information generating unit 351, coding unit 312, mapping unit 313, frame constructing unit 314, band separating unit 352, IFFT unit 315, GI inserting unit 316, radio transmitting unit 317

BEST MODES FOR CARRYING OUT THE INVENTION

First, embodiments of the present invention will be described below by referring to the drawings.

In the description herein, a communication apparatus that receives CQIs and transmits information data is referred to as a transmitter, while a communication apparatus that receives the information data and transmits the CQIs is referred to as a receiver. Communication from the transmitter to the receiver is referred to as downlink, while communication from the receiver to the transmitter is referred to as uplink.

A radio communication apparatus according to a first embodiment of the present invention will be described below. By referring to FIGS. 1A and 1B, differences caused by channel variations will be described.

While the receiver is moving relative to the transmitter, channel variation occurs due to the influence of the Doppler effect and the like related to that movement. The rate of the channel variation (i.e., Doppler frequency) is proportional to the moving speed of the receiver and the frequency of the channel. For this reason, even with the same receiver, the channel variation rate is higher in a lower frequency band than a higher frequency band.

FIG. 1A is a diagram showing an example of channel variation in a case where communication is performed using two different bands. FIG. 1A shows an example where, as the upper diagram shows, the CQIs of all the bands are transmitted at an interval suitable for a low frequency band. In FIG. 1A, each solid line extending vertically indicates a timing to transmit a CQI on the time line (horizontal axis). Here, it can be seen that in the low frequency band, the CQIs reported to the transmitter can report the actual channel variations with a sufficient accuracy.

On the other hand, as shown in the lower diagram of FIG. 1A, in a high frequency band, the CQI transmission interval shown in FIG. 1 is too wide for the rate of the channel variation. It can be seen that the CQIs reported to the transmitter cannot report the actual channel variations with a sufficient accuracy.

Figure 1B:
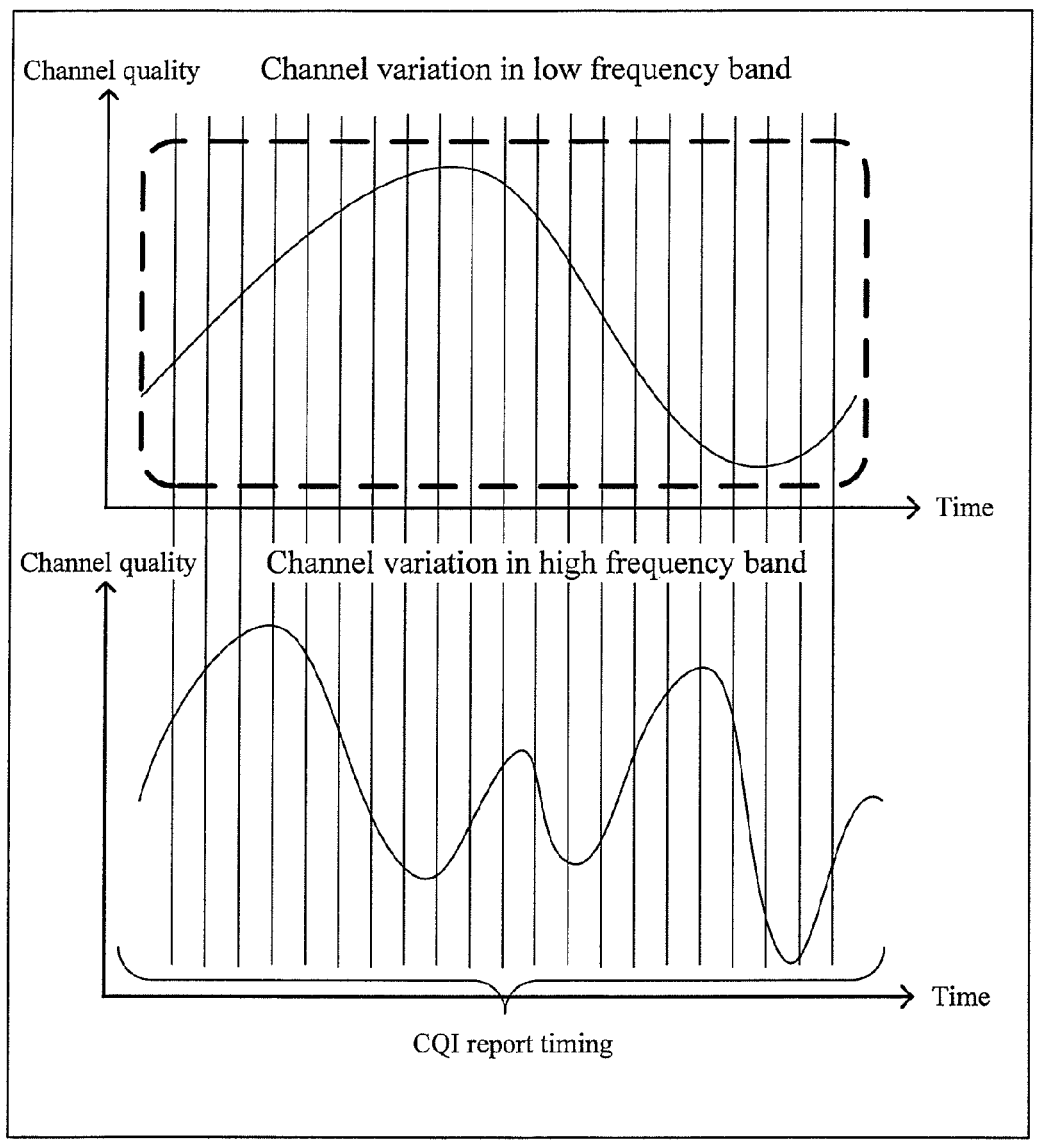
FIG. 1B is, in contrast, a diagram showing an example where CQIs of all the bands are transmitted at an interval suitable for a high frequency band.

In contrast, FIG. 1B is a diagram showing an example where CQIs of all the bands are transmitted at an interval suitable for a high frequency band. Unlike the case of FIG. 1A, it can be seen that the actual channel variations can be reported with a sufficient accuracy in the high frequency band, as the lower diagram shows. However, as shown in the upper diagram, in the low frequency band, the CQI transmission interval is so narrow that the CQIs are transmitted by the number of times that is more than necessary for the low frequency band. In other words, the channel quality report is performed inefficiently.

Thus, the radio communication technique according to the embodiment is characterized in that the transmission intervals of the CQIs based on the channel qualities of the respective bands are set shorter for a shorter carrier wave frequency and longer for a longer carrier wave frequency. This allows the receiver to continue to report CQIs at intervals suitable for the variations of the channels of the bands. Thus, the channel quality information on the communication band as a whole can be reported efficiently. As a result, in communication performed while reporting the CQIs associated with all the bands, the effects of the scheduling and AMC are enhanced, whereby the transmission efficiency of the whole system is improved.

As a specific example, description will be given below of an example where the present invention is applied to a radio communication technique employing an OFDM communication scheme that uses, for the downlink, subcarriers orthogonal to each other on the frequency axis. Note, however, that the present invention is applicable to other communication schemes that use multiple carriers to transmit data, and that the OFDM communication scheme is shown merely as an example. Moreover, the description will be given using an exemplary apparatus configuration where the communication based on the OFDM communication scheme is performed while using only one band for the uplink. However, the uplink may be of a communication scheme using a single carrier or of a non-ODFM communication scheme using multiple carriers. Furthermore, it is possible to employ a communication scheme using multiple bands for the uplink.

Hereinbelow, the configurations of a receiver and a transmitter in a radio communication technique according to the first embodiment of the present invention will be described in detail.

1) Receiver
a) Receiving Part of Receiver

Figure 2:
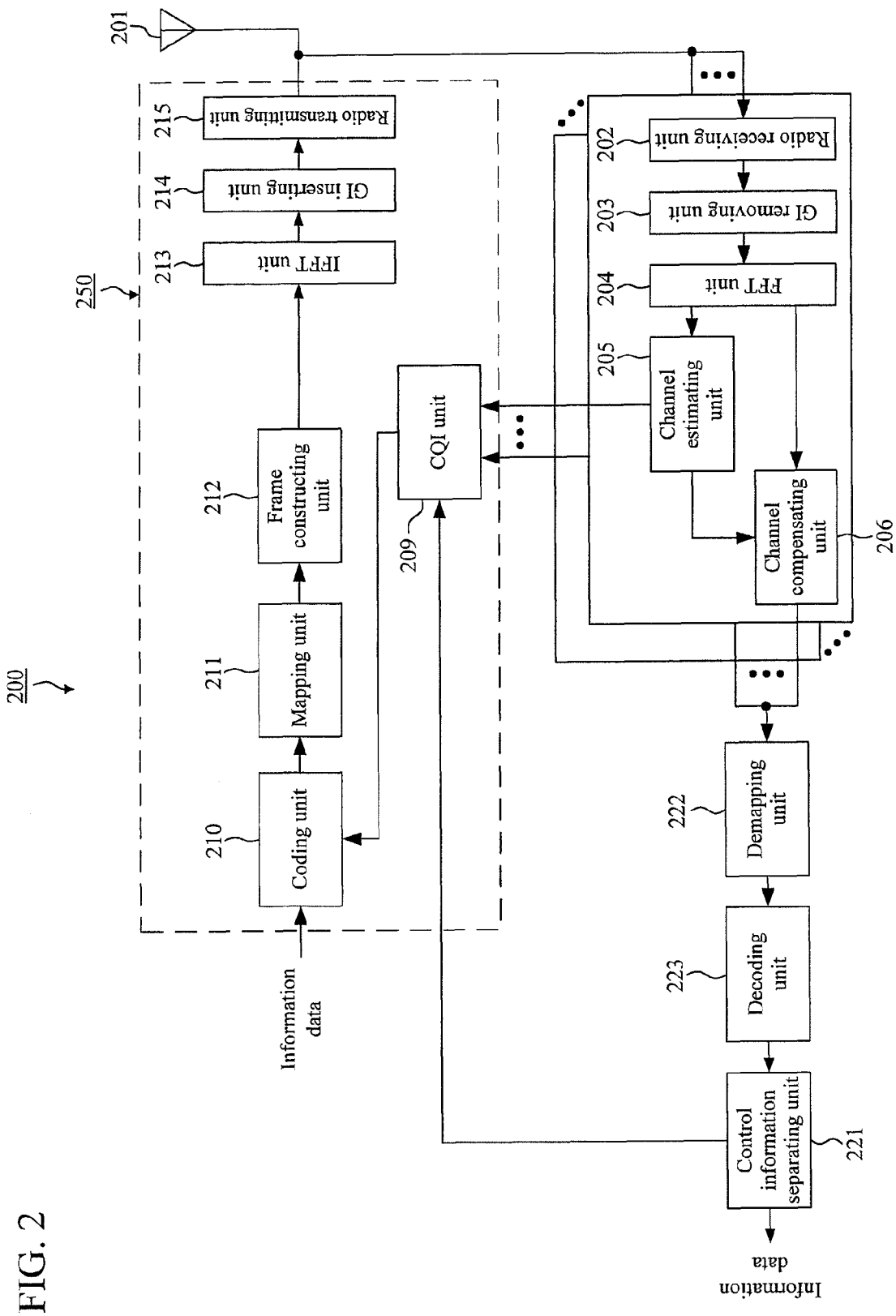
FIG. 2 is a functional block diagram showing an example of the configuration of a receiver according to a first embodiment of the present invention.

FIG. 2 is a functional block diagram showing an example of the configuration of a receiver 200 according to the present embodiment. As shown in FIG. 2, the receiver 200 includes an antenna 201, a radio receiving unit 202, a GI (Guard Interval) removing unit 203, an FFT (Fast Fourier Transform) unit 204, a channel estimating unit 205, a channel compensating unit 206, a demapping unit 222, a decoding unit 223, a control information separating unit 221, a CQI unit 209, a coding unit 210, a mapping unit 211, a frame constructing unit 212, an IFFT (Inverse Fast Fourier Transform) unit 213, a GI inserting unit 214, and a radio transmitting unit 215.

FIG. 2 shows an example where the radio receiving unit 202, the GI (Guard Interval) removing unit 203, the FFT (Fast Fourier Transform) unit 204, the channel estimating unit 205, and the channel compensating unit 206 are provided for each band; however, it is possible to employ a configuration where only one set of these units is provided and used to perform processing sequentially for each band.

As shown in FIG. 2, the receiver 200 receives a downlink signal, which is transmitted by a transmitter 300 (FIG. 3), through the antenna 201, and inputs the received signal to the radio receiving unit 202. The radio receiving unit 202 is provided for each band. Each radio receiving unit 202 separates a signal of its corresponding band from the received signal, converts the separated signal into a digital signal of a base band, and then inputs the digital signal to the GI removing unit 203. The GI removing unit 203 removes a GI from the base band digital signal and inputs the digital signal to the FFT unit 204.

The FFT unit 204 performs FFT on the base band digital signal, from which a GI has been removed, to separate the modulation symbol of each subcarrier, and inputs it to both the channel estimating unit 205 and the channel compensating unit 206. The channel estimating unit 205 performs channel estimation for each subcarrier and inputs the estimation value thereof to the channel compensating unit 206 for each subcarrier. Based on the cannel estimation value of each subcarrier, the channel compensating unit 206 carries out channel compensation on the corresponding modulation symbol, and inputs the modulation symbol to the demapping unit 222.

Here, the radio receiving unit 202, the GI removing unit 203, the FFT unit 204, the channel estimating unit 205, and the channel compensating unit 206 are provided to each band, and the processing is performed for each band.

The demapping unit 222 performs data demodulation from the modulation symbols on the basis of the modulation scheme of the subcarriers of all the bands, and inputs the demodulated data to the decoding unit 223. The decoding unit 223 decodes the demodulated data on the basis of a corresponding coding scheme, and inputs the decoded data to the control information separating unit 221. The control information separating unit 221 separates control information from the decoded data, and inputs the control information to the CQI unit 209. The control information separating unit 221 also outputs the data other than the control information as information data.

The CQI unit 209 generates CQIs on the basis of the estimation values received from the channel estimating units 205 of the bands, respectively, and outputs the CQIs to the coding unit 210. Details of the CQI unit 209 will be described later.

b) Transmitting Part of Receiver

The coding unit 210 codes the information data and the CQIs and inputs the coded data to the mapping unit 211. The mapping unit 211 maps the coded data and the CQIs for each subcarrier to generate a modulation symbol, and inputs the transmission data to the frame constructing unit 212 for each carrier.

The frame constructing unit 212 constructs a frame by use of the modulation symbols and inputs the frame to the IFFT unit 213. The IFFT unit 213 performs IFFT on the modulation symbols, which have been formed into a frame, to generate a base band digital signal, and inputs the base band digital signal to the GI inserting unit 214. The GI inserting unit 214 adds a GI to the base band digital signal and inputs the base band digital signal to the radio transmitting unit 215. The radio transmitting unit 215 up-converts the base band digital signal, to which a GI has been added, to the frequency of a carrier wave and inputs the up-converted signal to the antenna 201 as an uplink signal. The antenna 201 transmits the uplink signal to the transmitter 300.

Here, the above-described CQI unit 209, coding unit 210, mapping unit 211, frame constructing unit 212, IFFT unit 213, GI inserting unit 214, and radio transmitting unit 215 are collectively referred to as a CQI reporting unit 250.

c) Details of CQI Unit

Figure 6:
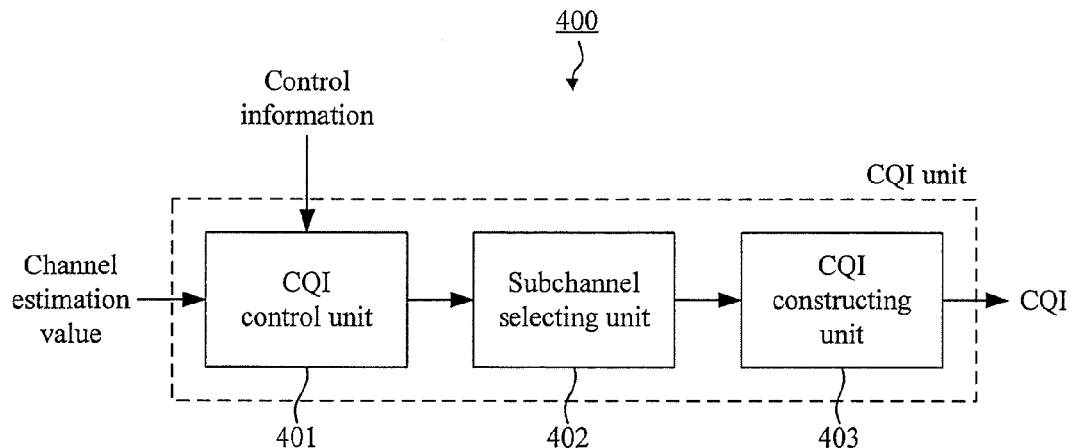
FIG. 6 is a diagram showing a CQI unit in the receiver in FIG. 2.

Details of the CQI unit 209 will be described below. FIG. 6 is a diagram showing the CQI unit 209 in the receiver in FIG. 2. At report timings based on the control information received from the control information separating unit 221, a CQI controlling unit 401 respectively inputs subchannel estimation values of report bands based on the control information, to a subchannel selecting unit 402.

Based on the subchannel estimation values thus received, the subchannel selecting unit 402 selects a predetermined number (M) of subchannels, and inputs, to a CQI constructing unit 403, information indicating the selected subchannels, and the qualities of the selected channels. Based on a predetermined format, the CQI constructing unit 403 constructs CQIs by using the qualities of the selected channels and the information indicating the selected channels, and inputs the CQIs to the coding unit 210. Here, as the channel quality, an average value of each of SNR, SINR, and CINR of the subcarriers belonging to the subchannel is used. Alternatively, the poorest quality among the subcarriers included in the subchannel may be used as the channel quality of the subchannel, or information indicating the MCS required by the receiver may be used as the channel quality.

1) Transmitter a) Receiving Part of Transmitter

Figure 3:
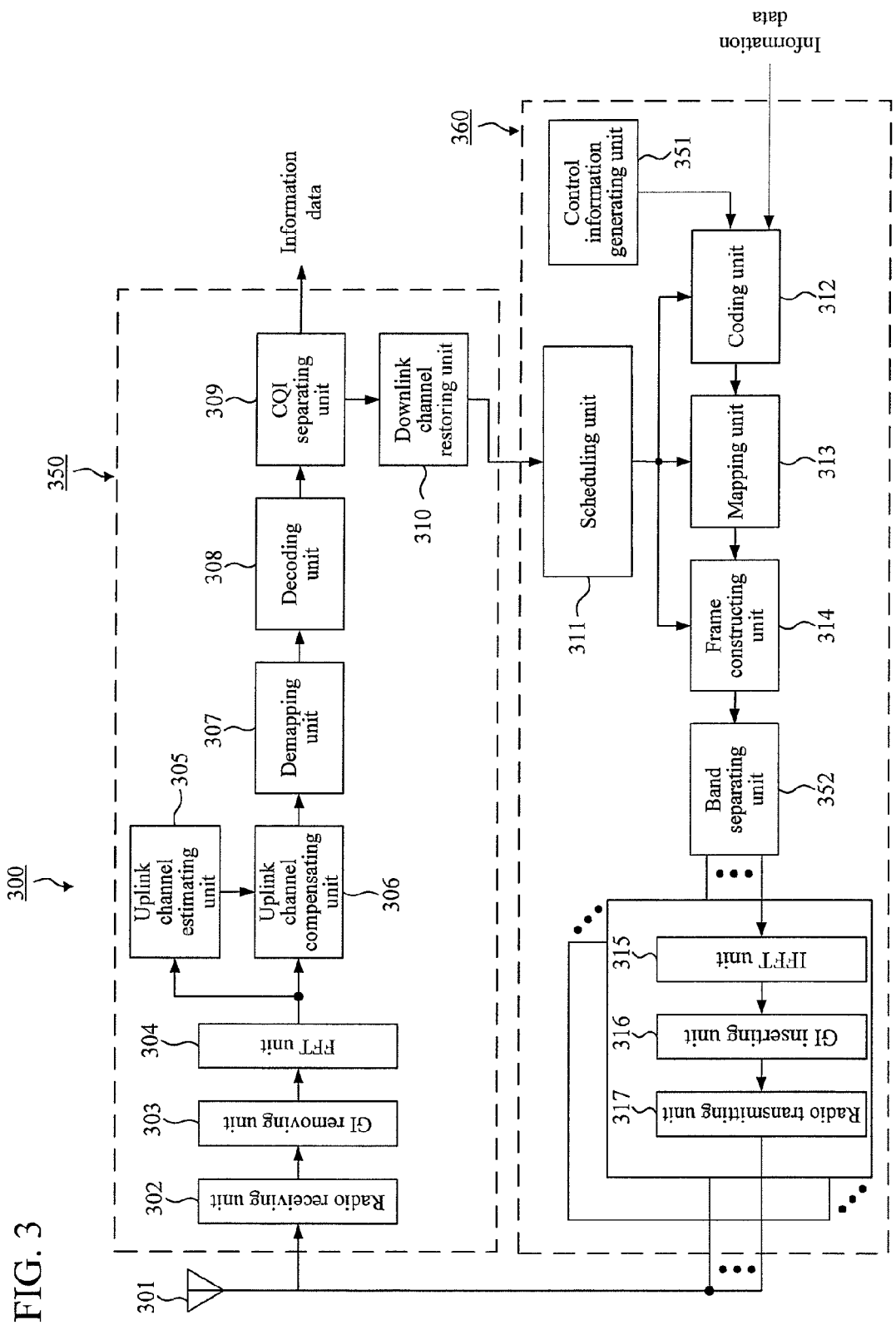
FIG. 3 is a functional block diagram showing an example of the configuration of a transmitter according to the embodiment.

FIG. 3 is a functional block diagram showing an example of the configuration of the transmitter 300 according to the present embodiment. As shown in FIG. 3, the transmitter 300 includes an antenna 301, a radio receiving unit 302, a GI removing unit 303, an FFT unit 304, an uplink channel estimating unit 305, an uplink channel compensating unit 306, a demapping unit 307, a decoding unit 308, a CQI separating unit 309, a downlink channel restoring unit 310, a scheduling unit 311, a control information generating unit 351, a coding unit 312, a mapping unit 313, a frame constructing unit 314, a band separating unit 352, an IFFT unit 315, a GI inserting unit 316, and a radio transmitting unit 317. FIG. 3 shows an example where the IFFT unit 315, the GI inserting unit 316, and the radio transmitting unit 317 are provided for each band; however, it is possible to employ a configuration where only one set of these units is provided and used to perform processing sequentially for each band.

As shown in FIG. 3, the antenna 301 receives the uplink signal transmitted by the receiver. The radio receiving unit 302 converts the received signal to a digital signal of a base band and inputs the converted signal to the GI removing unit 303.

The GI removing unit 303 removes a GI from the base band digital signal and inputs the base band digital signal, from which a GI has been removed, to the FFT unit 304. The FFT unit 304 performs FFT on the base band digital signal, from which a GI has been removed, to separate the modulation symbol of each subcarrier, and inputs it to both the uplink channel estimating unit 305 and the uplink channel compensating unit 306 for each subcarrier. The uplink channel estimating unit 305 performs channel estimation and inputs the estimation values thereof to the uplink channel compensating unit 306. Based on the channel estimation values received from the uplink channel estimating unit 305, the uplink channel compensating unit 306 carries out channel compensation on the modulation symbols of the respective subcarriers, which are received from the FFT unit, and inputs the modulation symbols to the demapping unit 307. The demapping unit 307 demodulates each of the modulation symbols on the basis of the modulation scheme of the corresponding subcarrier, and inputs the demodulated data to the decoding unit 308. The decoding unit 308 decodes the demodulated data on the basis of the corresponding coding scheme, and inputs the decoded data to the CQI separating unit 309. The CQI separating unit 309 separates CQIs from the data received from the decoding unit 308, and inputs the CQIs to the downlink channel restoring unit 310 and outputs the signals other than the CQI as information data. Based on the CQIs separated by the CQI separating unit 309, the downlink channel restoring unit 310 restores the channel qualities of the respective downlink subchannels.

Here, the above-described radio receiving unit 302, GI removing unit 303, FFT unit 304, uplink channel estimating unit 305, uplink channel compensating unit 306, demapping unit 307, decoding unit 308, CQI separating unit 309, downlink channel restoring unit 310, are collectively referred to as a CQI acquiring unit 350.

b) Details of Scheduling Unit

Based on the downlink channel quality information on each receiver 200 received from the downlink channel restoring unit 310, the scheduling unit 311 determines which subchannels, transmission bands, and MCS should be used for the transmission to the receiver 200. Alternatively, which subchannels and MCS should be used for the transmission may be determined based on the data transmission rate required by the receiver 200 or the amount of data needed to be transmitted to the receiver 200, in addition to the downlink channel quality information. Moreover, the scheduling unit 311 inputs the determined result to the coding unit 312, the mapping unit 313, and the frame constructing unit 314. At this time, the scheduling unit 311 inputs, to the coding unit 312, control information for the CQIs which the receiver returns next. At the same time, the scheduling unit 311 also inputs, to the coding unit 312, information indicating the result of allocation regarding which MCS should be used for which subchannel for the transmission.

Here, for the allocation of subchannels to receivers 200, a method is employed in which subchannels are allocated to a receiver 200 indicating the best channel qualities in the subchannels (MAX-CIR). Note that in the embodiment, description will be given based on the example using the MAX-CIR method; however, some other method may be employed for the allocation to receivers 200, such for example as proportional fairness.

Besides the above methods, the allocation may be manipulated by using some other information which the transmitter 300 has, in addition to the channel quality information. For example, the scheduling unit 311 may control the subchannels to be allocated, on the basis of the data transmission rates required by the receivers 200, in addition to the channel quality information. It is also possible to employ a method in which the subchannels to be allocated are regulated for those receivers 200 that can be enough satisfied with their required transmission rates even after regulating the rates of the subchannels to be allocated thereto. Further, for those receivers requiring the transmission of large amounts of data, subchannels may be allocated with higher priority than the other receivers.

Figures 7A, 7B:
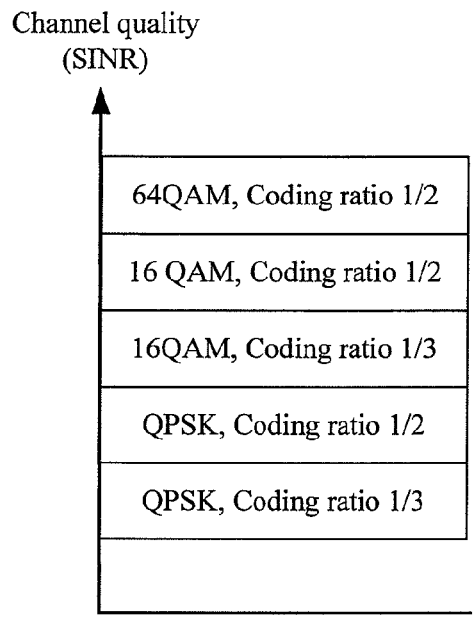
FIG. 7A is a diagram showing an example of an MCS determined based on channel quality information through adaptive modulation.
FIG. 7B is a table for reporting the MCS to the transmitter.

Next, an example of determining the MCS for the allocated subchannel will be described. FIG. 7A is a diagram showing an example of the MCS determined based on the channel quality information through adaptive modulation. When the channel quality changes from lowest to highest, the MCS is changed accordingly in the order shown in FIG. 7A. The lowest SINR in FIG. 7A indicates that no transmission is performed. That is, the lowest SINR in FIG. 7A represents a state where "the channel quality is so poor that even the MCS of the lowest rate cannot satisfy the required error rate characteristics." Here, a threshold that changes the pair of MCSs is determined as follows, for example.

Consider an environment where, in a propagation path where the transmitter and the receiver perform one-to-one communication, only a white Gaussian noise is added and no fading occurs. The communication is performed while suppressing the packet error rate to or below a desired value. As the SINR changes, the packet error rate in each MCS changes. Each MCS in a range with a low channel quality shown in FIG. 7A is less vulnerable to a noise of a large power. On the other hand, when the noise power is small, the MCS in a range with a high channel quality shown in FIG. 7A provides a small packet error rate, hence satisfying the desired packet error rate. Accordingly, when the white Gaussian noise reaches a certain power, the MCS on the higher channel quality side satisfies the desired packet error rate. At this time, MCSs on a higher rate side are selected rather than MCSs on a lower rate side. The threshold for each MCS is set as a channel quality corresponding to a noise power at a line indicating whether the MCS on the higher channel quality side at that time satisfies the desired packet error rate or not. Besides the packet error rate, a threshold which maximizes the throughput may be used to switch the MCS; alternatively, some other method that adaptively controls the MCS may be employed.

Meanwhile, as a method of reporting the MCS to the transmitter, there is for example a method in which a table as shown in FIG. 7B is shared by the transmitter and the receiver, and "CQI index" corresponding to each MCS (corresponding to the rightmost row in FIG. 7B) is fed back. Here, "out of range" in a case of CQI index=0 in FIG. 7B indicates a state where "the channel quality is so poor that even the MCS with the lowest rate cannot satisfy the required error rate characteristics," as in a case of the bottom range in FIG. 7A.

c) Summary of Control Information Generating Unit

Meanwhile, the control information generating unit 351 here generates and inputs control information to the coding unit 312. By reporting the control information generated in the control information generating unit 351 to the receiver, the transmitter switches the control on the CQI transmission interval and the reporting band. Details of the operation therefor will be described later.

d) Transmitting Part of Transmitter

Based on the MCS allocated to each subcarrier of each receiver 200, the coding unit 312 in FIG. 3 codes the information data, the allocation information, and the control information and inputs them to the mapping unit 313. Based on the MCS allocated to each subcarrier of each receiver 200, the mapping unit 313 maps the coded data for each subcarrier to generate a modulation symbol, and inputs the modulation symbol to the frame constructing unit 314 for each subcarrier. Based on the MCS information inputted by the scheduling unit 311, the frame constructing unit 314 constructs a frame by use of the modulation symbols, and inputs the modulation symbols formed into a frame to the IFFT unit 315 for each band. Each IFFT unit 315 performs IFFT on the modulation symbols formed into a frame, to create a base band digital signal, and inputs the base band digital signal to the GI inserting unit 316. The GI inserting unit 316 adds a GI to the base band digital signal and inputs the base band digital signal, to which a GI has been added, to the radio transmitting unit 317. The radio transmitting unit 317 up-converts the base band digital signal, to which a GI has been added, to the frequency of a carrier wave and transmits the transmission data to the receiver 200 through the antenna 301.

Here, the IFFT unit 315, the GI inserting unit 316, and the radio communicating unit 317 exist for each communication band. The radio transmitting units 317 input a downlink signal, which is obtained by combining their respective up-converted signals together, to the antenna 201. The antenna 201 transmits the downlink signal to the transmitter 200.

Here, the control information generating unit 351, the scheduling unit 311, the coding unit 312, the mapping unit 313, the frame constructing unit 314, the band separating unit 352, the IFFT unit 315, the GI inserting unit 316, and the radio transmitting unit 317 are collectively referred to as a control information transmitter (360).

Next, the method of controlling the CQI transmission interval and the CQI report band, which is performed by the control information generating unit 351, will be described.

Figure 4:
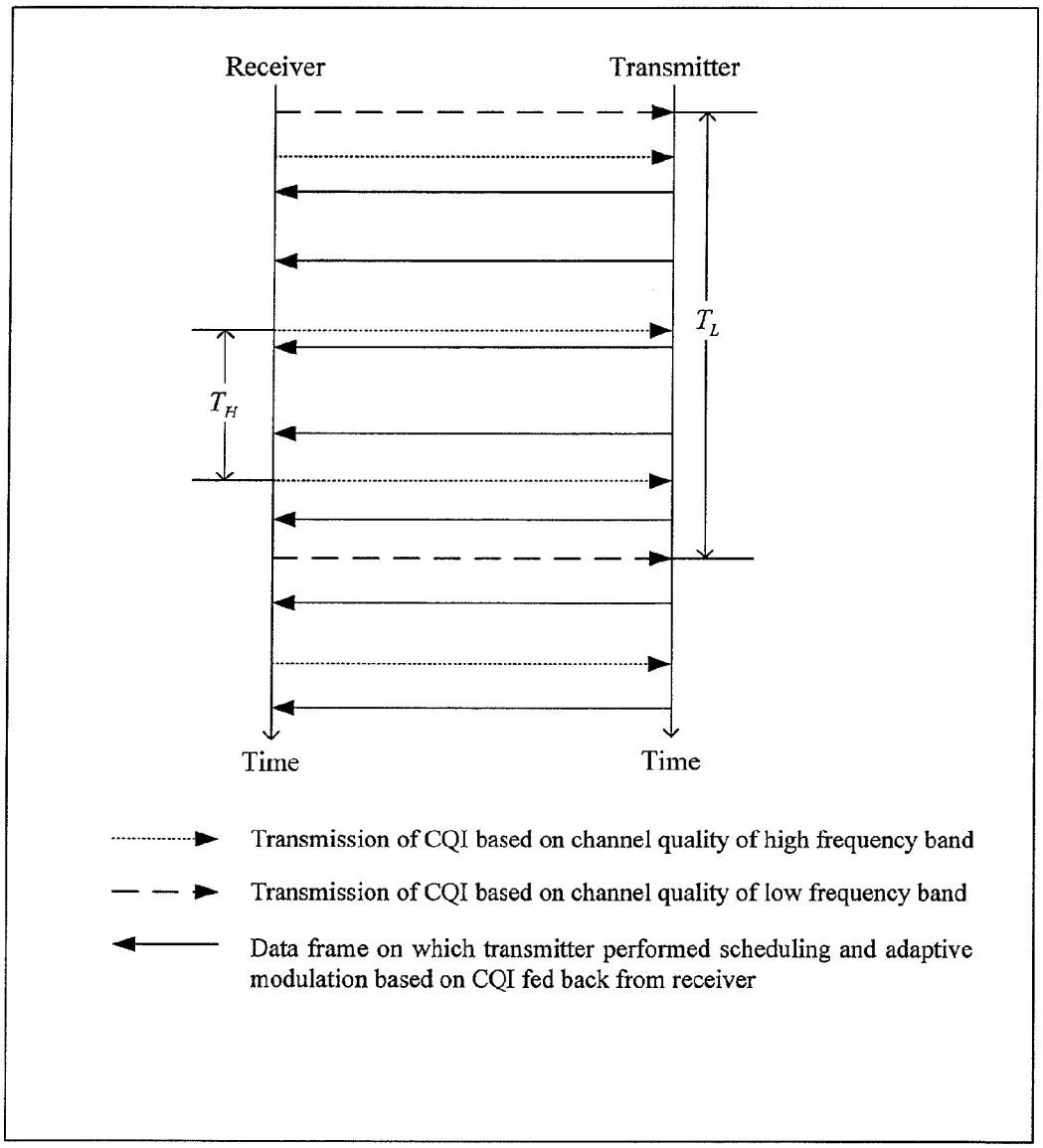
FIG. 4 is a sequence diagram showing an example of information communication between the receiver and the transmitter.

FIG. 4 is a sequence diagram showing an example of information communication between the receiver and the transmitter. Each arrow with a dotted line indicates the transmission of a CQI based on the channel quality of a high frequency band. Each arrow with a broken line indicates the transmission of a CQI based on the channel quality of a low frequency band. Each arrow with a solid line indicates the transmission of a data frame having undergone scheduling and adaptive modulation based on the CQI fed back from the receiver to the transmitter. If two bands are used for the communication, the transmission intervals are so controlled as to be transmission intervals T as shown in FIG. 4. Here, the CQI based on the high frequency band is transmitted at an interval $T_R$, whereas the CQI based on the low frequency band is transmitted at an interval $T_L$. $T_H$ and $T_L$ each do not necessarily have to be a fixed interval, but as shown in FIG. 4, should always satisfy $T_H<T_L$, which is a characteristic feature of the present invention. In addition, the purpose of allowing each of $T_H$ and $T_L$ not to be a fixed interval is for the embodiment to include cases other than a case where the CQI report timing is periodic.

Figure 5:
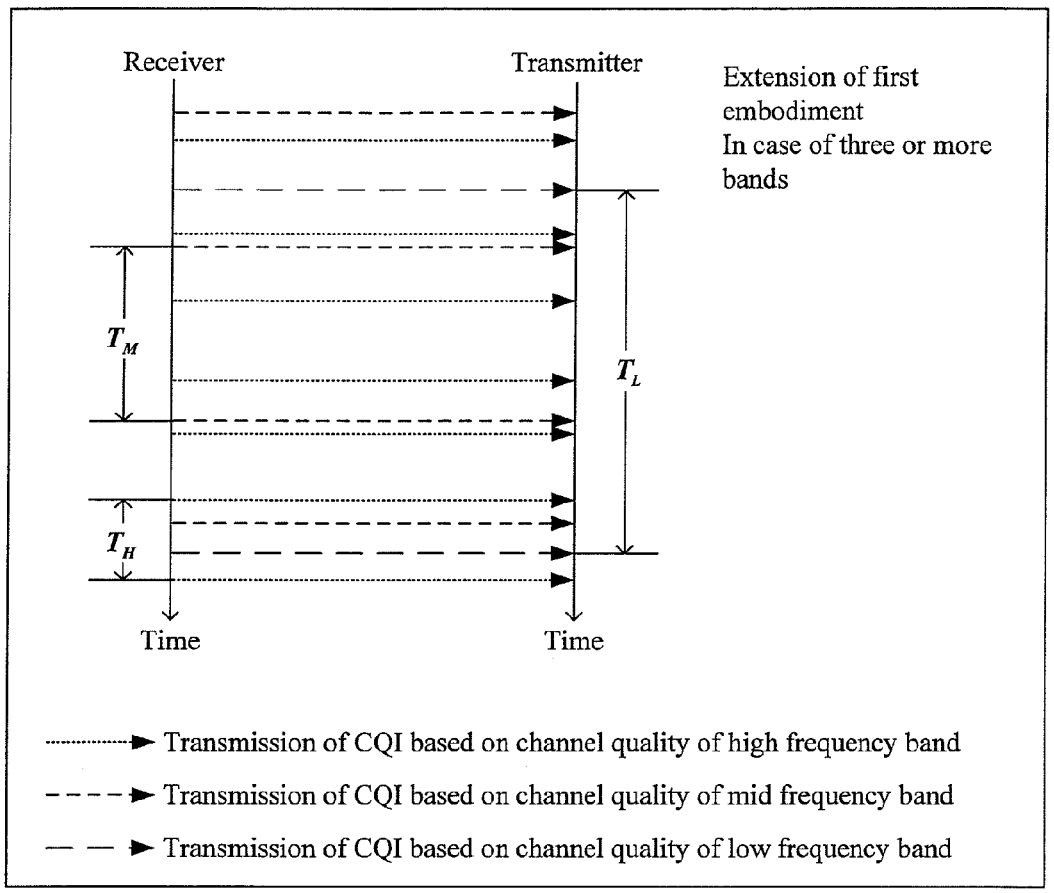
FIG. 5 is a sequence diagram in a case of three or more bands (frequency bands), and a sequence diagram showing the transmission intervals of CQIs.

FIG. 5 is a sequence diagram in a case of three or more bands (frequency bands), and a sequence diagram showing the transmission intervals of CQIs. In other words, the communication technique according to the embodiment is applicable to a case of three or more bands.

In FIG. 5, $T_H$ indicates the interval at which to transmit the CQI based on the high frequency band; $T_L$, the interval at which to transmit the CQI based on the low frequency band; and $T_M$, the interval at which to transmit the CQI based on a band with a frequency between the high frequency band and the low frequency band.

Each of $T_H$, $T_M$, and $T_L$ does not necessarily have to be a fixed interval. However, as shown in FIG. 5, the CQIs are transmitted in such a manner that $T_H<T_M<T_L$ is always satisfied. The transmitter performs scheduling and adaptive modulation in accordance with the CQIs based on the respective bands and transmitted from the receiver at the respective intervals.

Note that each of the above-described CQI transmission intervals is determined based on the carrier wave frequency, but may be determined also based on the moving speed of the receiver such that the interval of the CQI based on the channel quality of a higher frequency band would be made shorter and the interval of the CQI based on the channel quality of a lower frequency band would be made longer.

e) CQI Control Information

With the control information generating unit 351, the transmitter generates control information that allows the CQIs to be reported to the receiver at the timings as described by referring to FIGS. 4 and 5, and transfers the control information to the receiver. As the control information, one as described below is preferable.

To allocate the resource of the uplink for transmitting the CQIs is to specify two matters, namely, the transmission timings and the subchannels used for the transmission.

In the following, (A1), (A2), and (A3) each describe information specifying the transmission timing of the CQI, whereas (B1), (B2), and (B3) each describe information specifying the subchannel to transmit the CQI. The resource for CQI transmission may be allocated by using any combination of one selected from (A1), (A2), and (A3) and one selected from (B1), (B2), and (B3). In addition, the method of specifying the resource for CQI transmission may differ from one band to another.

(A1): control information including information individually specifying the timing to transmit the CQI every predetermined number of times the CQI is transmitted.

(A2): control information specifying the initial CQI transmission timing as well as the cycle of the transmission.

(A3): control information including information reporting which downlink subchannel is used for the data communication.

Here, the subchannel to be allocated to the downlink and the timing to transmit the CQI in the uplink are set in a one-to-one relationship. The relationship is shared by the transmitter and the receiver. By looking at the allocation information on the downlink subchannel, one can figure out at which timing the receiver should transmit the CQI.

(B1): control information including information specifying the subchannel to be used to transmit the CQI.

(B2): control information including information specifying the uplink subchannel to be used for the initial CQI transmission. After the initial CQI transmission, the receiver transmits the CQI by using the same subchannel.

(B3): control information including information reporting which downlink subchannel is used for the data communication.

Here, the subchannel to be allocated to the downlink and the subchannel for transmitting CQI to be allocated to the uplink are set in a one-to-one relationship. The relationship is shared by the transmitter and the receiver. By looking at the allocation information on the downlink subchannel, one can figure out at which subchannel the receiver should transmit the CQI.

As has been described above, according to the embodiment, among multiple bands, the CQI based on the channel quality of a high frequency band is reported more frequently, whereas the CQI based on the channel quality of a low frequency band is reported less frequently. Hence, the CQIs can be reported respectively at report intervals that follow the rates of the variations of channels of mutually different bands.

Accordingly, the channel quality information for the communication band as a whole can be reported efficiently. This results in such an advantage that in communication performed while reporting the CQIs associated with all the bands, the effects of the scheduling and AMC can be enhanced, whereby the transmission efficiency of the whole system is improved.

f) CQI Format

Meanwhile, in the embodiment, the CQI format is described based on an exemplary method in which M subchannels are selected based on the subchannel estimation values belonging to the report bands, and the qualities of the selected channels and the information indicating the selected channels are reported. Though different from FIG. 6, the block configuration of the CQI unit may be, for example, any one of what are described below. Some other CQI format may be employed as well.

(1) A method in which M subchannels are selected based on the subchannel estimation values belonging to the report bands, and an average value of the qualities of the selected channels and information indicating the selected channels are reported.

(2) A method in which an average value of the channel qualities of all the subchannels in the report bands is reported.

(3) A method in which the qualities of all the subchannels included in the report bands are reported.

(4) A method in which the channel quality of each subchannel is subjected to DCT conversion and M coefficients of lower orders are reported.

In addition, FIG. 3 is described as a case where the transmitter transmits data in accordance with an OFDM scheme. Instead, the transmission may be performed in accordance with a DFT-S-OFDM scheme. In this case, a DFT unit that performs DFT (Discrete Fourier Transform) by using multiple modulation symbols transmitted to one receiver, is inserted between the mapping unit and the frame constructing unit of the transmitter. Along with this, an IDFT unit that performs IDFT (Inverse Discrete Fourier Transform) on the modulation symbols having undergone the channel compensation is inserted for each band after the channel compensating unit 206 of the receiver shown in FIG. 2. Such a configuration makes it possible to achieve DFT-S-OFDM.

Moreover, the transmitter may perform the transmission in accordance with a MC-CDMA scheme. In this case, a spreading unit that performs spreading with the modulation symbols to be transmitted to one receiver by using a Walsh code, is inserted between the mapping unit and the frame constructing unit of the transmitter. Along with this, a reverse spreading unit that subjects the modulation symbols having undergone the channel compensation to reverse spreading is inserted for each band after the channel compensating unit 206 of the receiver shown in FIG. 2. Such a configuration makes it possible to achieve MC-CDMA.

Next, a second embodiment of the present invention will be described.

A radio communication technique according to the embodiment of the present invention relates to a case where CQIs based on respective bands are transmitted periodically in a communication system where data is transmitted and received in units of frame having a fixed time length.

Since other configurations of the transmitter and the receiver are similar to those in the first embodiment (FIGS. 2 and 3), description thereof is omitted. In the following, the CQI transmission timing, which is a characteristic feature of the embodiment, will be described in detail.

Figure 8:
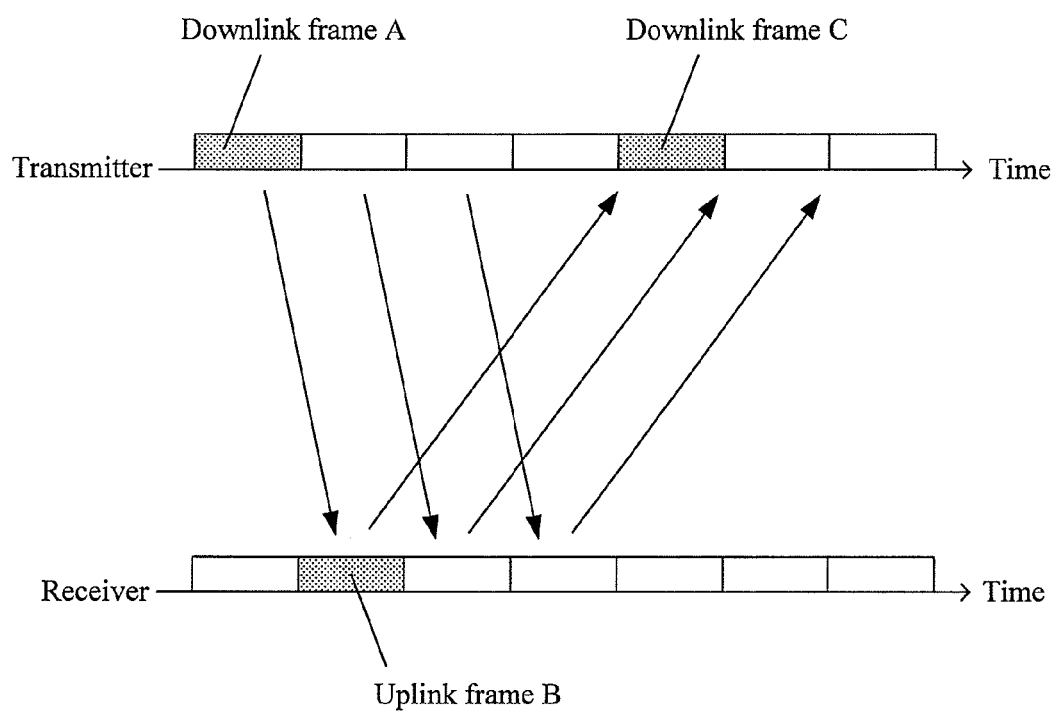
FIG. 8 is a diagram showing the relationship between a receiver and a transmitter in a second embodiment of the present invention in units of frame.

The embodiment is an embodiment based on a case where the frame length is fixed for both uplink and downlink. Description will be given of the relationship between a transmitted frame and a received frame for AMC and scheduling, which serves as the premise of the embodiment. FIG. 8 is a diagram showing the relationship between a receiver and a transmitter in a second embodiment of the present invention in units of frame.

First, as shown in FIG. 8, the receiver receives a downlink frame A as shown by an arrow. Then, the receiver uses the downlink frame A to perform channel estimation, and based on the result thereof, creates and reports a CQI to the transmitter by means of an uplink frame B. Then, the transmitter uses the CQI included in the received frame B to perform scheduling and AMC, and transmits data by means of a frame C. As shown in FIG. 8, the timings of the frames A, B, and C do not coincide with one another, and are in fact shifted from one another in the time direction in the order of A, B, and C.

Moreover, the relative transmission timings of the frames A, B, and C are fixed. If the frame A for channel estimation shifts by a frame length of N, the frames B and C also shift by the frame length of N in the same direction. Here, N is an integer. The relationship between the downlink frame and the uplink frame is similar in all the embodiments following this embodiment.

In the following, the CQI report cycle including N frames means that data including the CQI is transmitted once in every N frames.

Figure 9:
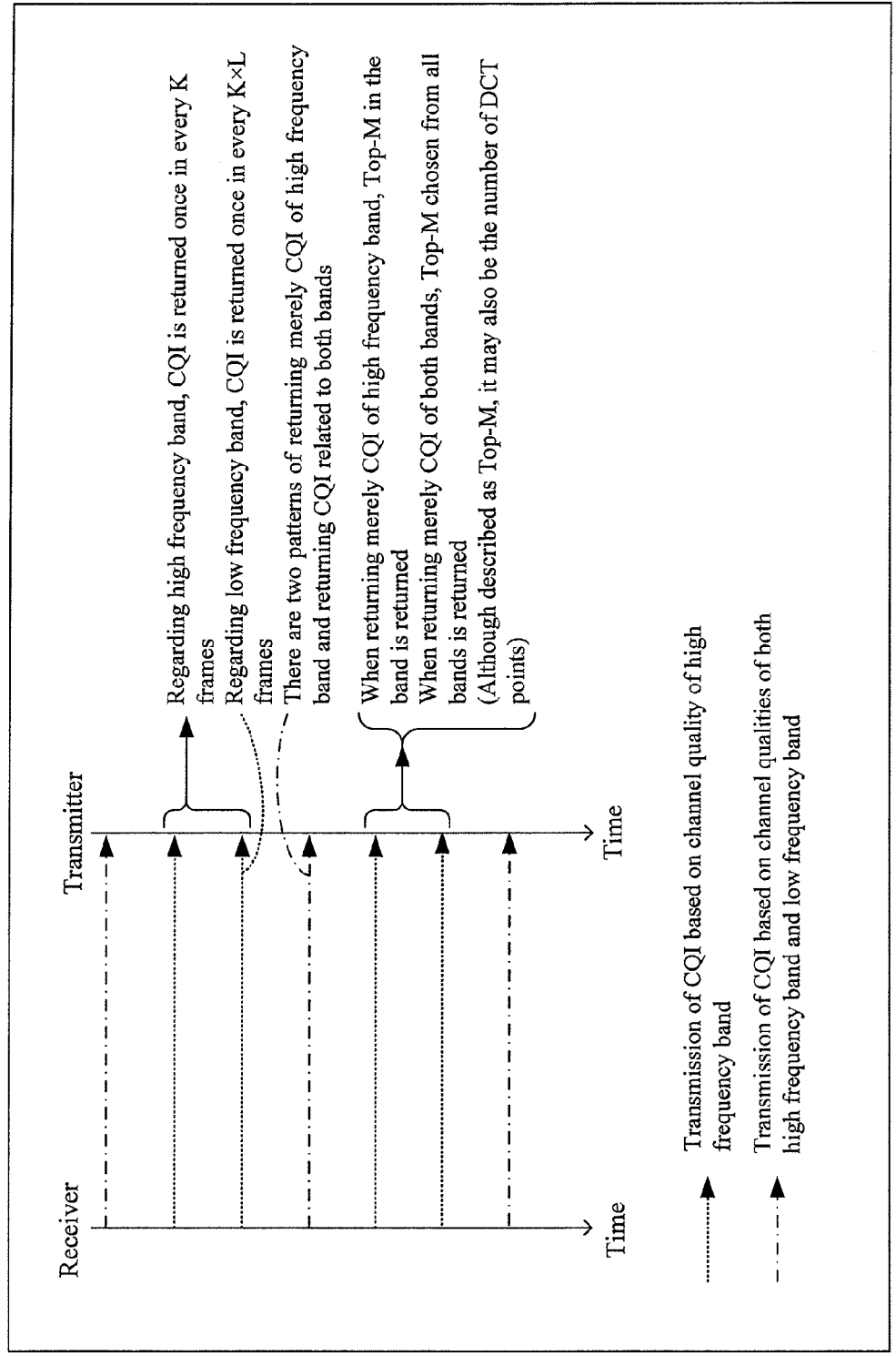
FIG. 9 is a sequence diagram showing transmission timings in the second embodiment of the present invention.

In the embodiment, CQIs are transmitted at the timings as shown in FIG. 9. In FIG. 9, the CQI based on the channel quality of a high frequency band is returned once in every L frames (an arrow with a dotted line). The CQI based on the channel qualities of both the high frequency band and a low frequency band is returned once in K times, i.e., once in every K×L frames (an arrow with a dashed line). Here, K and L are natural numbers.

As specific CQI formats, examples as below can be cited. In a case of returning merely a CQI based on a high frequency band, a CQI that is generated by selecting the high frequency band in the CQI unit 400 in FIG. 6 as described in the first embodiment, is returned. Now, consider a case where frames for returning CQIs based on the channel qualities of a high frequency band and a low frequency band overlap each other. In this case, in the CQI unit 400 in FIG. 6, the receiver selects M subchannels from among all the subchannels in both bands and returns information that indicates the M subchannels and a CQI that indicates information indicative of the qualities of the M subchannels. This can be regarded as simultaneously returning the CQI based on the high frequency band and the CQI based on the low frequency band.

Accordingly, it is possible to achieve a long report cycle for the CQI based on the channel quality of the low frequency band and a short report cycle for the CQI based on the channel quality of the high frequency band, without breaking the periodic pattern of reporting the CQIs of both bands.

Figure 10:
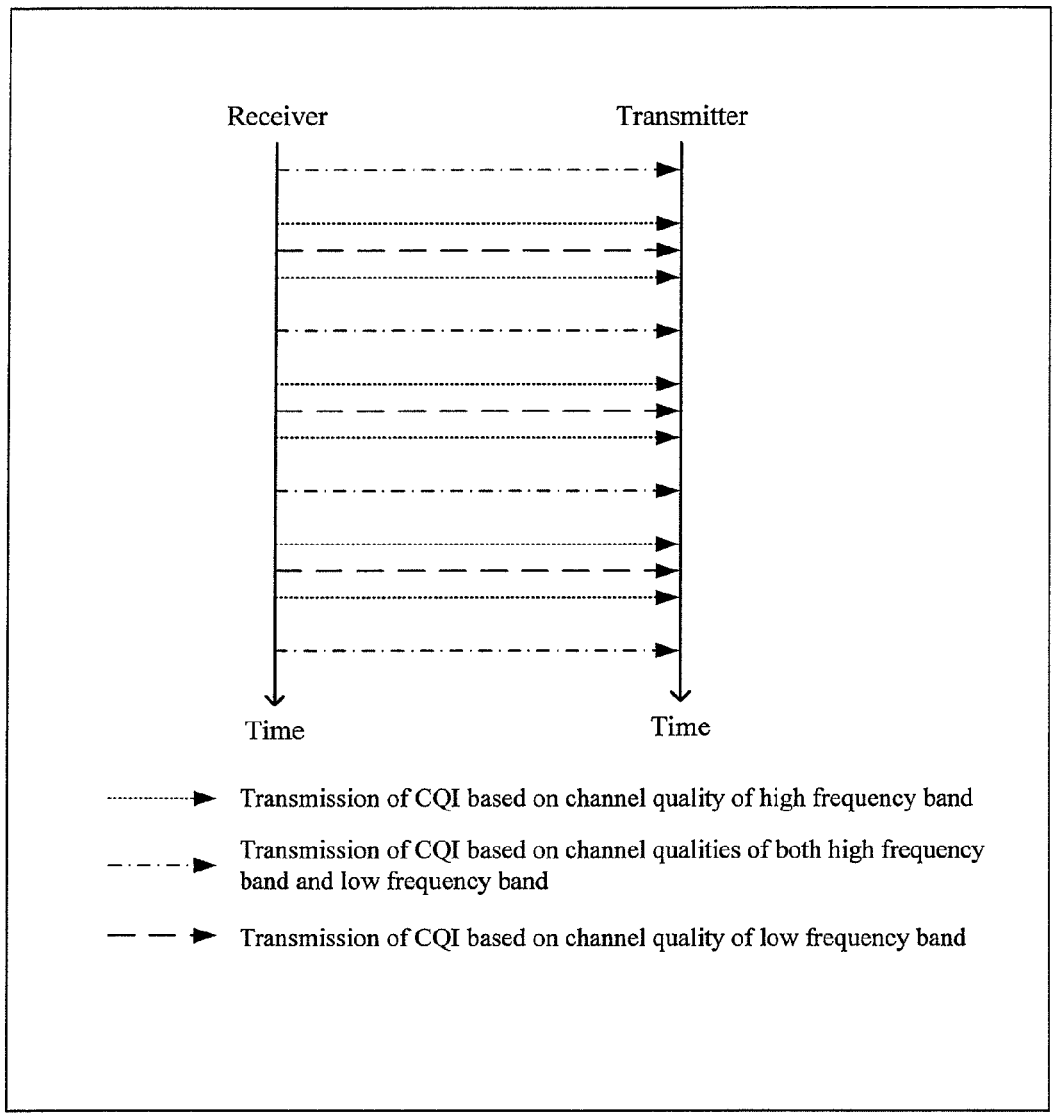
FIG. 10 is a sequence diagram of a modification of FIG. 9.

Note that although the sequence diagram showing the transmission timings according to the embodiment has been described by referring to FIG. 9, it is possible to employ a method shown in FIG. 10 to be described below. The CQI based on the channel quality of a high frequency band indicated by an arrow with a dotted line is returned once in every L frames, and the CQI based on the channel quality of a low frequency band indicated by an arrow with a broken line is returned once in every P frames so that transmission cycles shown in the timing chart shown in FIG. 10 can be obtained. Here, L and P are integers that satisfy L<P. In FIG. 10, 2L=P. Here, since L and P are integers, there exists inevitably a timing at which the CQIs of both the high frequency band and the low frequency band are returned simultaneously (an arrow with a dashed line). In this case, one CQI based on both bands is returned.

a) CQI Control Information

With the control information generating unit 351, the transmitter generates control information that allows the CQIs to be reported to the receiver at the timings as described by referring to FIG. 10, and transfers the control information to the receiver. In the embodiment, the transmitter generates the control information by use of a method similar to that described in the first embodiment.

b) CQI Format

As specific CQI formats, examples as described below can be cited. In a case of returning merely a CQI based on a high frequency band, a CQI that is generated by selecting the high frequency band by use of the CQI control unit 400 in FIG. 6 is returned. In the case of returning merely a CQI based on a low frequency band, a CQI that is generated by selecting the low frequency band by use of the CQI control unit 400 in FIG. 6 is returned. Now, consider a case where frames for returning CQIs based on the channel qualities of a high frequency band and a low frequency band overlap each other. In this case, with the CQI unit 400 in FIG. 6, the receiver selects M subchannels from among all the subchannels in both bands and returns information that indicates the M subbands and a CQI that indicates information indicative of the qualities of the M subbands. In this way, the CQI associated with both frequency bands can be returned periodically together with the frames responsible for returning, in the same frame, the CQIs based on both frequency bands.

In the embodiment, by using the above method, the receiver can report CQIs in cycles that are suitable for the variations of the channels of both bands. Hence, the channel quality information on the communication band as a whole band can be reported efficiently. This results in such an advantage that in communication performed while reporting the CQIs associated with all the bands, the effects of the scheduling and AMC can be enhanced, whereby the transmission efficiency of the whole system is improved.

In this embodiment, the description has been given based on a case of using two communication bands. Note, however, that the embodiment is applicable similarly to a case of including three or more bands.

c) CQI Format

Meanwhile, in the embodiment, the CQI format is described based on an exemplary method in which M subchannels are selected based on the subchannel estimation values belonging to the report bands, and the qualities of the selected channels and the information indicating the selected channels are reported.

Though different from FIG. 6, the block configuration of the CQI unit may be, for example, any one of what are described below. Some other CQI format may be employed as well.

(1) A method in which M subchannels are selected based on the subchannel estimation values belonging to the report bands, and an average value of the qualities of the selected channels and information indicating the selected channels are reported. When the CQIs of two or more bands are to be returned in the same frame, M subchannels are selected from among all the subchannels included in the two or more bands, and an average value of the selected channels and information indicating the channels are reported.

(2) A method in which an average value of the channel qualities of all the subchannels in the report bands is reported. When the CQIs of two or more bands are to be returned in the same frame, the subchannels included in the two or more bands, and an average value of the channel qualities of all the subchannels included in the two or more bands are reported.

(3) A method in which the qualities of all the subchannels included in the report bands are reported. When the CQIs of two or more bands are to be returned in the same frame, the subchannels included in the two or more bands, and the channel qualities of all the subchannels included in the two or more bands are reported.

(4) A method in which the channel quality of each subchannel is subjected to DCT conversion and M coefficients of lower orders are reported. When the CQIs of two or more bands are to be returned in the same frame, the qualities of the channels included in the two or more bands may be subjected to DCT conversion for each band, and a predetermined number of lower order coefficients may be reported for each band. Alternatively, the qualities of the channels included in the two or more bands may be converted by performing DCT conversion once, and M coefficients of lower orders may be reported.

Next, a third embodiment of the present invention will be described below. In the second embodiment above, described is a technique applied to a case where CQIs based on respective bands are reported periodically. The third embodiment of the present invention relates to a technique applied to a case where a frame including a CQI (the CQI here includes CQIs associated with all the bands) is allocated to the receiver.

Since other configurations of the transmitter and the receiver are similar to those in the first embodiment (FIGS. 2 and 3), description thereof is omitted. In the following, the CQI transmission timing of the embodiment will be described in detail. In addition, in the embodiment, the communication is performed based on transmitting and receiving timings similar to those mentioned by referring to FIG. 8 in the description of the second embodiment.

Figure 11:
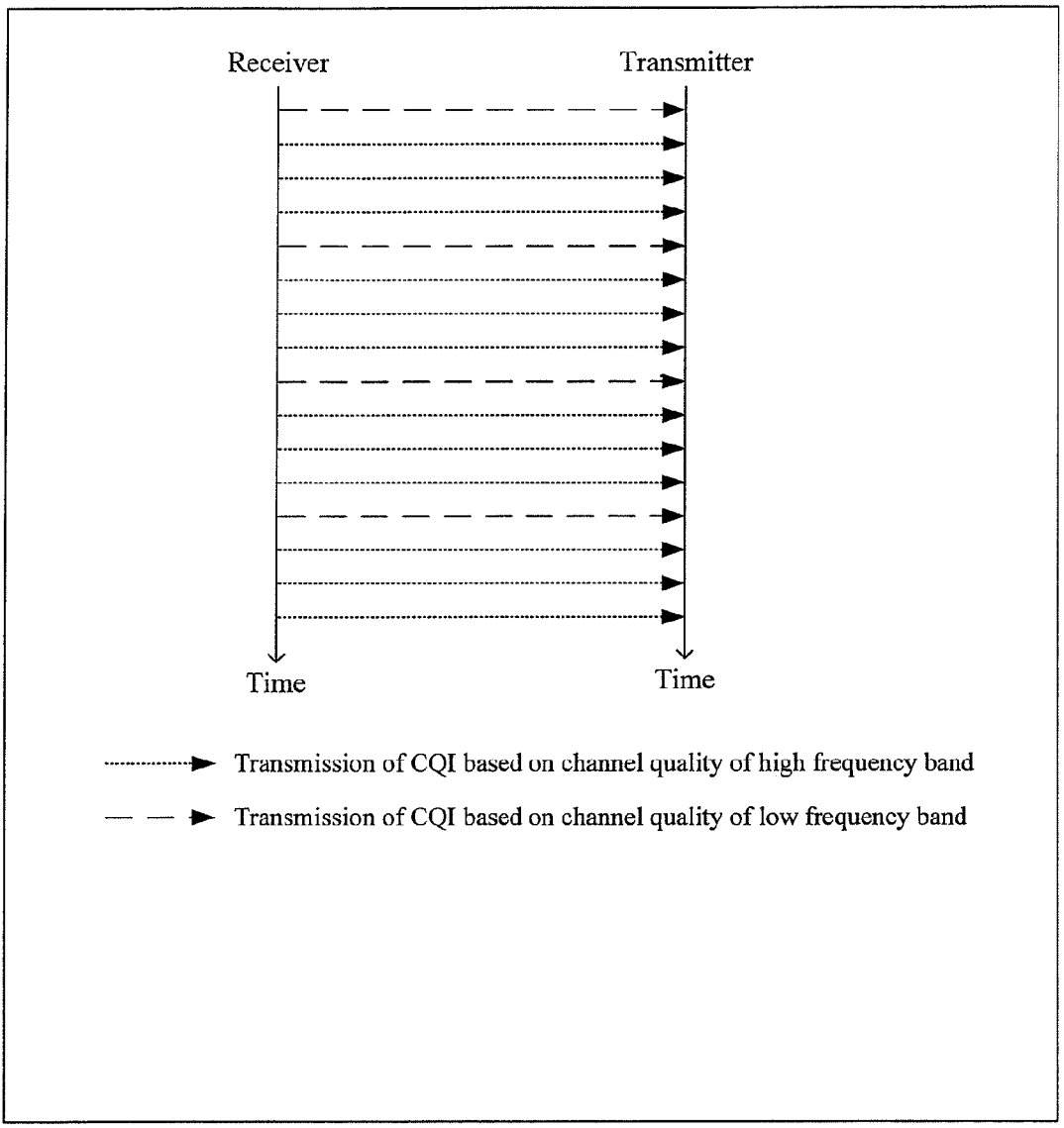
FIG. 11 is a sequence diagram showing CQI transmission timings in a third embodiment of the present invention.

FIG. 11 is a sequence diagram showing CQI transmission timings in the third embodiment of the present invention. In FIG. 11, the CQI is returned every frame regardless whether the band is of a high or low frequency (the CQI may not be returned every frame as long as returned once in every two frames, for example). At this time, the CQI associated with a low frequency band is returned R times in every N times, whereas the CQI associated with a high frequency band is returned N−R times in every N times. Here, R is set as a number smaller than N−R. To be specific, while returning the CQI N times, the receiver returns the CQI based on the low frequency band R times and returns the CQI based on the high frequency band N−R times (where R<N−R). With R<N−R, the number of times the receiver returns the CQI based on the high frequency band is larger than the number of times the receiver returns the CQI based on the low frequency band.

With the control information generating unit 351, the CQI control information transmitter generates control information that allows the CQIs to be reported to the receiver at timings as described in FIG. 11, and transfers the control information to the receiver.

Accordingly, the receiver can continue to report CQIs in cycles that are suitable for the variations of the channels of both bands. Hence, the channel quality information on the communication band as a whole can be reported efficiently. This results in such an advantage that in communication performed while reporting the CQIs associated with all the bands, the effects of the scheduling and AMC can be enhanced, whereby the transmission efficiency of the whole system is improved.

Note that as to the CQI format, any of the formats listed in the first embodiment can be used. Moreover, in the embodiment, the description has been given based on a case of using two communication bands. However, the embodiment is also applicable to a case of three or more bands.

Next, a fourth embodiment of the present invention will be described below. The embodiment relates to a case where the transmitter transmits downlink data by use of two bands in a low frequency range and a high frequency range, and the receiver performs periodic CQI report as well as aperiodic CQI report if receiving a notification from the transmitter. In the embodiment, the communication is performed based on transmitting and receiving timings similar to those mentioned by referring to FIG. 8 in the description of the second embodiment.

a) Configurations of Transmitter and Receiver

Figure 13:
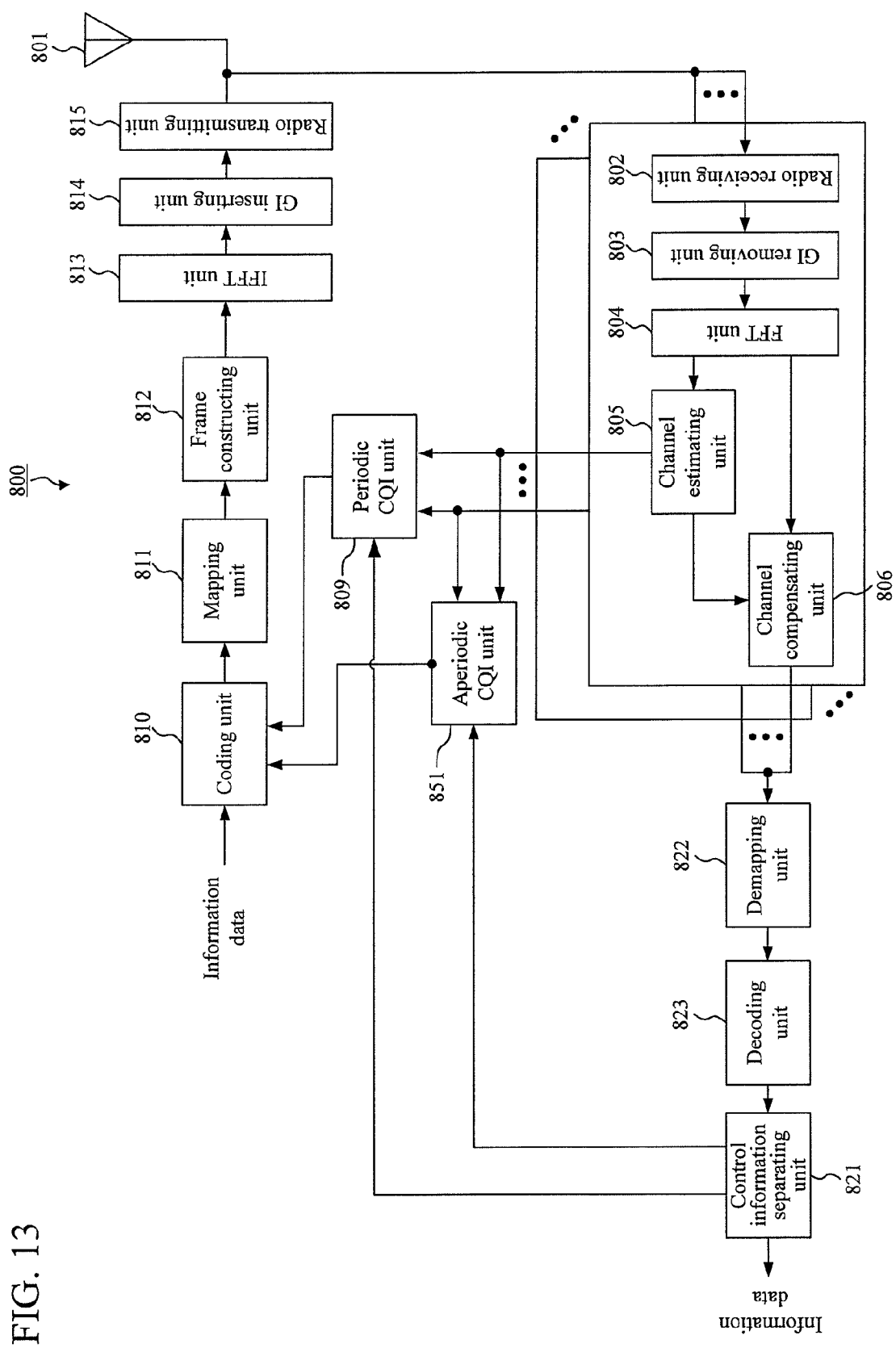
FIG. 13 is a diagram showing an example of the configuration of a receiver in the fourth embodiment of the present invention.

The transmitter used in the embodiment has the same configuration as that in the block diagram (FIG. 3) of the transmitter in the first embodiment described above, and thus description thereof is omitted. On the other hand, a receiver 800 used in the embodiment has a configuration in which as shown in FIG. 13, the control information separating unit 221 in the configuration in FIG. 2 in the first embodiment is replaced with a control information separating unit 821, and the CQI unit 209 is replaced with a periodic CQI unit 809 and an aperiodic CQI unit 851. Other configurations are not different from those in FIG. 2, and thus description thereof is omitted.

Here, the control information separating unit 821 separates periodic CQI control information and aperiodic CQI control information generated by the transmitter, and inputs the periodic CQI control information and the aperiodic CQI control information to the periodic CQI unit 809 and the aperiodic CQI unit 851, respectively. The periodic CQI unit 809 generates a periodic CQI at a timing described later, and inputs the periodic CQI to a coding unit 810. The aperiodic CQI unit 851 generates an aperiodic CQI at a timing described later, and inputs the aperiodic CQI to the coding unit 810.

b) Details of Periodic CQI Unit

The periodic CQI unit 809 has a configuration similar to that of the CQI unit in FIG. 6 described in the first embodiment.

c) Details of Aperiodic CQI Unit

Figure 14:
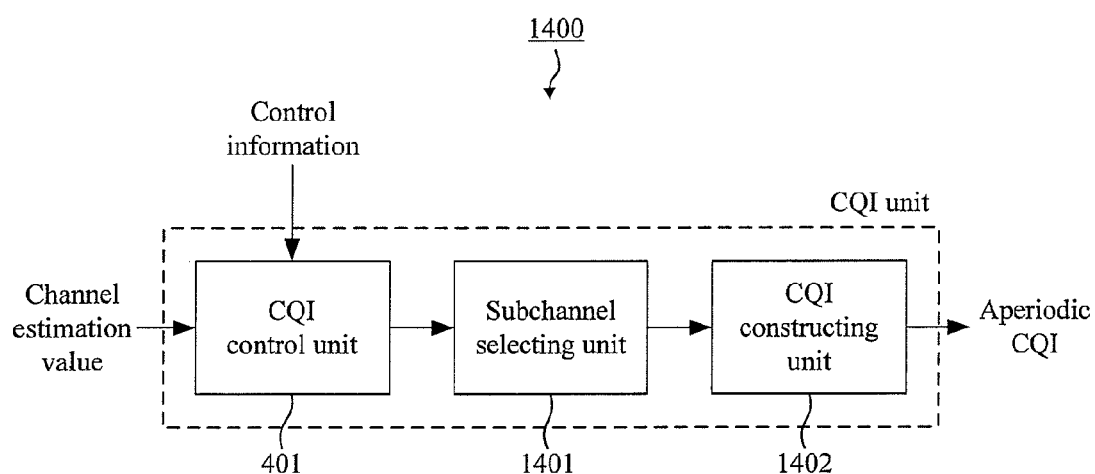
FIG. 14 is a diagram showing in detail the configuration of an aperiodic CQI unit in FIG. 13.

FIG. 14 is a diagram showing in detail the configuration of the aperiodic CQI unit 851 in FIG. 13. Upon receipt of an aperiodic CQI transmission command, a subchannel selecting unit 1401 in FIG. 14 selects a predetermined number (M) of subchannels on the basis of channel estimation values which are received from a channel estimating unit 805 and associated with a band in a high frequency range. The subchannel selecting unit 1401 then inputs information, which indicates the selected channels, and the qualities of the selected channels to a CQI constructing unit 1402. Based on a predetermined format, the CQI constructing unit 1402 constructs aperiodic CQIs by using the qualities of the selected channels and the information indicating the selected channels, and inputs the aperiodic CQIs to the coding unit.

d) Sequence Diagram

Figure 12:
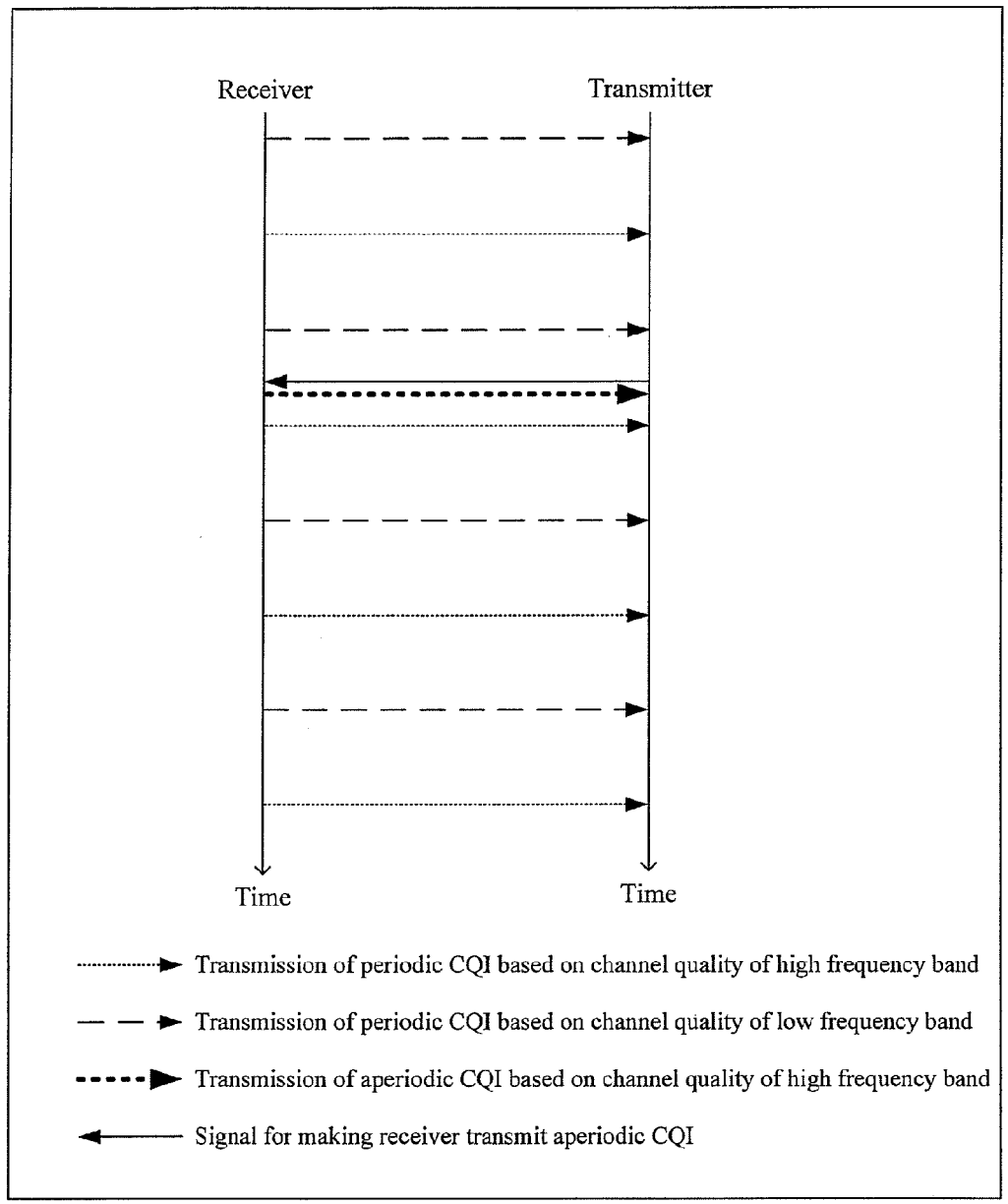
FIG. 12 is a sequence diagram showing CQI transmission timings in a fourth embodiment of the present invention.

In the embodiment, the periodic CQI and the aperiodic CQI are transmitted at timings shown in FIG. 12. Described is an example of employing periodic and aperiodic transmissions with LTE taken into consideration. In the periodic transmission, the CQIs of the respective bands are returned alternately. In the aperiodic transmission, the CQI associated with the high frequency band is returned. This, as a result, allows the CQI of the high frequency band to be returned more frequently.

As shown in FIG. 12, the CQI based on the channel quality of the high frequency band and the CQI based on the channel quality of the low frequency band are transmitted alternately by use of periodic CQIs. If the control information includes an aperiodic CQI transmission command, in addition to a periodic CQI, the receiver transmits an aperiodic CQI in a frame after a predetermined time elapsed since the transmission command, in addition to the periodic CQIs. That is, with the reports of the periodic CQIs and the aperiodic CQI added together, the CQI based on the high frequency range is reported more frequently than the CQI based on the low frequency range.

e) CQI Control Information

With the control information generating unit 351, the transmitter generates control information that allows the periodic CQIs to be reported to the receiver at the timings as described by referring to FIG. 12, and transfers the control information to the receiver. The transmitter generates control information including the periodic CQIs in accordance with a method similar to that described in the first embodiment. Moreover, for the aperiodic CQI, the transmission timing is specified using the method (A1) among the methods described in the first embodiment. The subchannel to be used to transmit the aperiodic CQI may be specified using any of the methods (B1), (B2), and (B3).

As described above, according to the embodiment, the receiver can continue to report CQIs with frequencies suitable for the variations of the channels of both bands. Thus, the channel quality information on the communication band as a whole can be reported efficiently. As a result, in communication performed while reporting the CQIs associated with all the bands, the effects of the scheduling and AMC are enhanced, whereby the transmission efficiency of the whole system is improved.

Note that as to the CQI format, any of the formats listed in the first embodiment can be used.

Next, a fifth embodiment of the present invention will be described below. The embodiment relates to a case where the receiver performs both periodic CQI report as well as aperiodic CQI report if receiving a notification from the transmitter in a communication system in which downlink data is transmitted by use of two bands in a low frequency range and a high frequency range.

The configurations of the transmitter and the receiver in the embodiment are the same as the configurations in the fourth embodiment (FIGS. 13 and 2). In the embodiment, the receiver reports the CQI based on a low frequency range more frequently than the CQI based on a high frequency range by using frames allocated for the purpose of reporting periodic CQIs. In addition, the transmitter notifies the receiver of an aperiodic CQI report command. Upon receipt of the aperiodic CQI report command, the receiver returns the CQI based on the high frequency range. At this time, the transmitter transmits the aperiodic CQI transmission command frequently to such an extent that, with the reports of the periodic and aperiodic CQIs added together, the CQI based on the high frequency range is reported more frequently than the CQI based on the low frequency range.

Accordingly, the receiver can continue to report CQIs with frequencies suitable for the variations of the channels of both bands. Thus, the channel quality information on the communication band as a whole can be reported efficiently. As a result, in communication performed while reporting the CQIs associated with all the bands, the effects of the scheduling and AMC are enhanced, whereby the transmission efficiency of the whole system is improved.

a) Sequence Diagram

Figure 15:
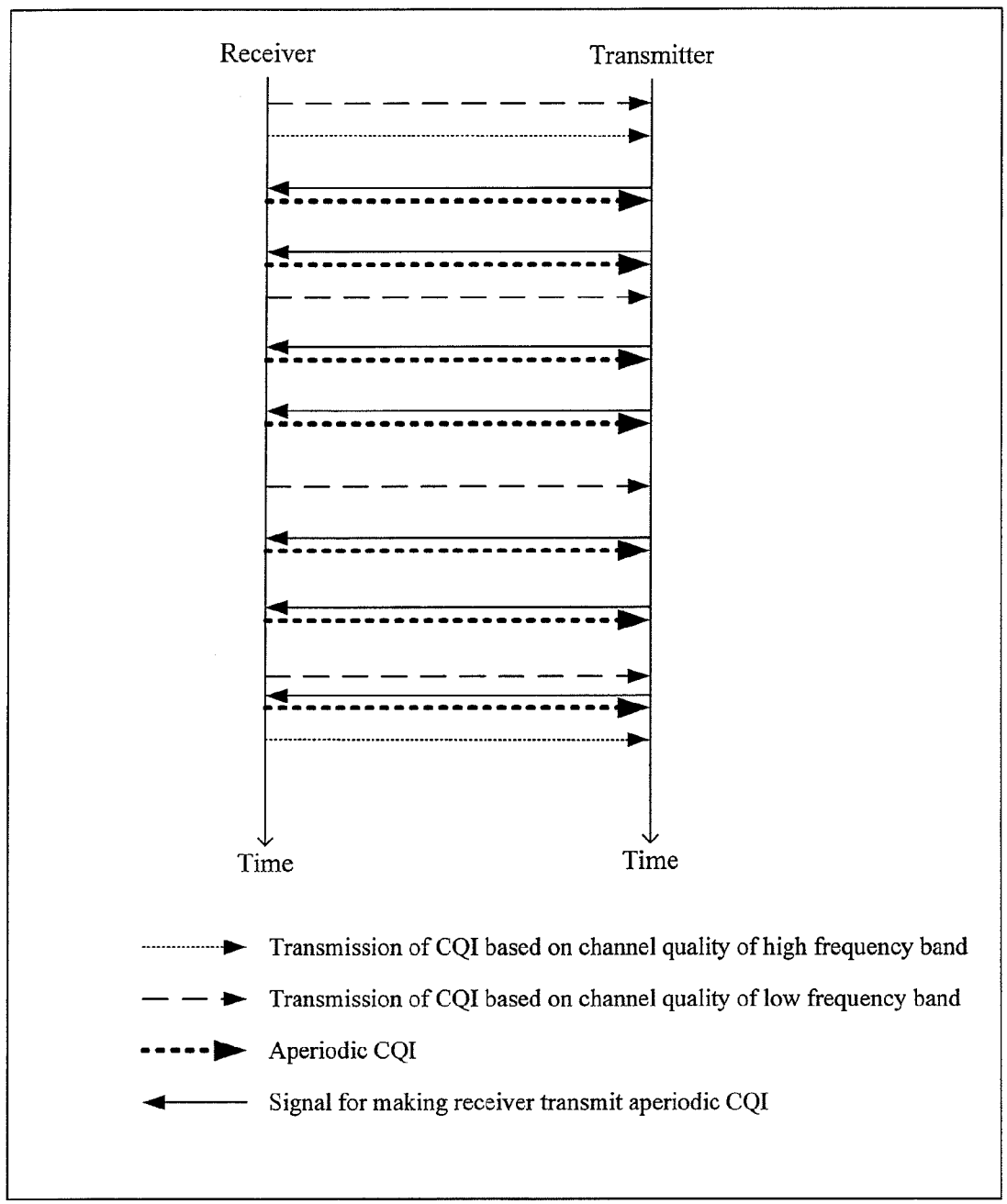
FIG. 15 is a sequence diagram of a case where S is 1 or greater and the CQI based on the channel quality of a high frequency band is reported also by means of a periodic CQI.
Figure 16:
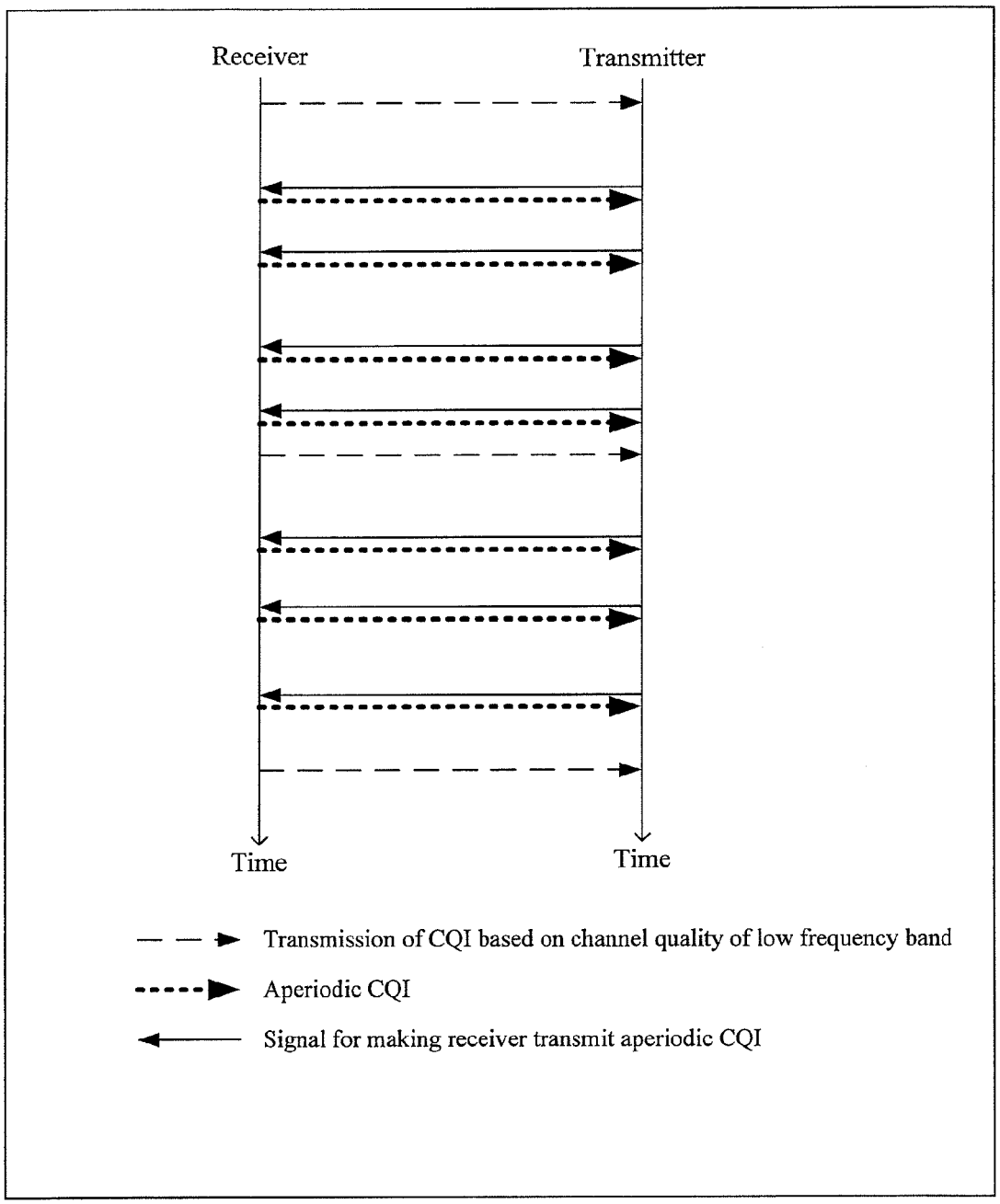
FIG. 16 is a sequence diagram of a case where K is 0 and the CQI based on the channel quality of a high frequency band is not reported by means of the periodic CQI.

In the embodiment, the periodic CQI and the aperiodic CQI are transmitted at timings shown in FIGS. 15 and 16. Described is a sequence diagram showing those timings.

For the periodic CQIs, while the CQI is returned N times, the CQI based on the high frequency band is returned S times, and the CQI based on the low frequency band is returned N−S times. Here, S<N−S. With S<N−S, the number of times to return the CQI based on the high frequency band is smaller than the number of times to return the CQI based on the low frequency band. Meanwhile, N is a natural number and S is a non-negative integer.

Here, FIG. 15 is an example where: S is 1 or larger; the CQI based on the channel quality of the high frequency band is reported also by means of the periodic CQI; and periodic and aperiodic transmissions are employed with LTE taken into consideration. While the periodic CQI is returned N times, the CQI of the low frequency band is returned N–S times, and the CQI of the high frequency band is returned S times. Here, S<N/2. However, in the aperiodic transmission, the CQI associated with the high frequency band is returned. When the CQI of the high frequency band is transmitted by use of its aperiodic CQI, the transmission is performed at intervals smaller than that of the periodic CQI.

Here, FIG. 16 is an example where: S is 0; the CQI based on the channel quality of the high frequency band is not reported by means of the periodic CQI; and periodic and aperiodic transmissions are employed with LTE taken into consideration. With the periodic CQI, merely the CQI of the low frequency band is returned. With the aperiodic CQI, merely the CQI of the high frequency band is returned. When the CQI of the high frequency band is transmitted by use of its aperiodic CQI, the transmission is performed at intervals smaller than that of the periodic CQI. FIG. 16 is a diagram showing a case where S (=the number of times to transmitted the high frequency band while the periodic CQI is transmitted N times) is set to 0. In other words, the periodic CQI causes only the CQI of the low frequency band to be transmitted. The aperiodic CQI causes only the CQI of the high frequency band to be transmitted. Since the aperiodic CQI is transmitted at the smaller interval, the CQI of the high frequency band is consequently fed back more frequently than the CQI of the low frequency band. If the control information includes an aperiodic CQI transmission command, the receiver transmits the aperiodic CQI in a frame after a predetermined time elapsed since the transmission command, in addition to the periodic CQI. The transmitter transmits the aperiodic CQI transmission command more frequently than the periodic CQI. Then, with the reports of the periodic and aperiodic CQIs added together, the CQI based on the high frequency range is reported more frequently than the CQI based on the low frequency range.

b) CQI Control Information

With the control information generating unit 351, the transmitter generates control information that allows the periodic CQIs and the aperiodic CQIs to be reported to the receiver at the timings as described by referring to FIGS. 15 and 16, and transfers the control information to the receiver. For the control information, it is possible to employ a method similar to that described in the fourth embodiment.

As described above, according to the embodiment, the receiver can continue to report CQIs with frequencies suitable for the variations of the channels of both bands. Thus, the channel quality information on the communication band as a whole can be reported efficiently. As a result, in communication performed while reporting the CQIs associated with all the bands, the effects of the scheduling and AMC are enhanced, whereby the transmission efficiency of the whole system is improved.

Note that as to the CQI format, any of the formats listed in the first embodiment can be used. In each of the embodiments described hereinabove, the configurations and the like are not limited to those depicted in the accompanying drawings, but can be changed as appropriate within the scope in which the effect of the present invention is exhibited. It is also possible to change and implement other matters without departing from the scope of the object of the present invention. Moreover, a program for achieving the functions described in the embodiments may be recorded in a computer-readable recording medium, and a computer system may be caused to read and execute the program recorded in the recording medium to perform the processing of the units. Note that the "computer system" here includes an OS and hardware such as peripheral equipment.

Moreover, if utilizing a WWW system, the "computer system" includes a website providing environment (or displaying environment).

Moreover, the "computer-readable recording media" refers to a portable medium such as a flexible disk, a magnetic optical disk, a ROM, and a CD-ROM, as well as a memory device such as a hard disk built in a computer system. Furthermore, the "computer-readable recording medium" includes: one that dynamically holds a program for a short period of time, such as a network including the Internet or the like, or a communication line used for transmitting the program through a communication channel such as a telephone line; and also one that holds the program for a certain period of time, such as a volatile memory in a computer system serving as a server or a client. Moreover, the program may be one that achieves part of the above-mentioned functions, and, in addition, may be one that can be achieved in combination with a program having the above-mentioned functions already recorded in a computer system.

INDUSTRIAL APPLICABILITY

The present invention is applicable to communication devices.

The publications, patents, and/or patent applications cited herein are incorporated herein by reference as it is.

The invention claimed is:

1. A receiver in a radio communication system including a transmitter and the receiver, the receiver comprising:
   a receiving unit configured to receive data via a plurality of bands;
   a CQI generator configured to generate a periodic CQI per all subchannels for each band of the plurality of bands; and
   a CQI reporter configured to report the periodic CQI with a time interval, wherein
   each of the subchannels consists of multiple subcarriers,
   the plurality of bands have different carrier frequencies,
   wherein said each band of the plurality of bands have different time intervals set by the transmitter,
   the plurality of bands are non-contiguous bands which are aggregately used for the radio communication system, and
   Inverse Fourier transform is performed band by band out of the plurality of bands.

2. The receiver according to claim 1 further comprising:
   a control information separator configured to extract control information from the data, wherein
   the control information includes information indicating the time intervals.

3. A transmitter in a radio communication system including the transmitter and a receiver, the transmitter comprising:
   a transmitting unit configured to transmit data to the receiver via a plurality of bands; and
   a CQI acquirer configured to acquire a periodic CQI per all subchannels for each band of the plurality of bands, wherein
   each of the subchannels consists of multiple subcarriers, the plurality of bands have different carrier frequencies,
wherein said each band of the plurality of bands have different time intervals set by the transmitter,
the plurality of bands are non-contiguous bands which are aggregately used for the radio communication system, and
Inverse Fourier transform is performed band by band out of the plurality of bands.

4. The transmitter according to claim 3 further comprising:
a control information generator configured to generate control information, wherein
the control information includes information indicating the time intervals.

5. A radio communication system comprising:
a transmitter; and
a receiver, wherein
the transmitter transmitting data to the receiver while allocating, to the receiver, one or more subchannels belonging to any of a plurality of bands,
the receiver receiving the data, and
the receiver includes:
 a receiving unit configured to receive the data via a plurality of bands;
 a CQI generator configured to generate a periodic CQI per all subchannels for each band of the plurality of bands, and
 a CQI reporter configured to report the periodic CQI with a time interval, and
the transmitter includes:
 a CQI acquirer configured to acquire the periodic CQI per all subchannels for said each band of the plurality of bands, wherein
each of the subchannels consists of multiple subcarriers,
the plurality of bands have different carrier frequencies,
wherein said each an of the plurality of bands have different time intervals set by the transmitter,
the plurality of bands are non-contiguous bands which are aggregately used for the radio communication system, and
Inverse Fourier transform is performed band by band out of the plurality of bands.

6. A method for receiving, in a radio communication system including a transmitter and a receiver, the method comprising:
receiving data via a plurality of bands;
generating a periodic CQI per all subchannels for each band of the plurality of bands; and
reporting the periodic CQI with a time interval, wherein
each of the subchannels consists of multiple subcarriers,
the plurality of bands have different carrier frequencies,
wherein said each band of the plurality of bands have different time intervals set by the transmitter,
the plurality of bands are non-contiguous bands which are aggregately used for the radio communication system, and
Inverse Fourier transform is performed band by band out of the plurality of bands.

7. A non-transitory computer-readable medium having instructions stored thereon, said instructions are read and executed by a processor for causing a processor to perform the method according to claim 6.

8. A method for transmitting, in a radio communication system including a transmitter and a receiver, the method comprising:
transmitting data to the receiver via a plurality of bands; and
acquiring a periodic CQI per all subchannels for each band of the plurality of bands, wherein
each of the subchannels consists of multiple subcarriers,
the plurality of bands have different carrier frequencies,
wherein said each band of the plurality of bands have different time intervals set by the transmitter,
the plurality of bands are non-contiguous bands which are aggregately used for the radio communication system, and
Inverse Fourier transform is performed band by band out of the plurality of bands.

* * * * *